US012399452B2

(12) United States Patent
Hasegawa

(10) Patent No.: US 12,399,452 B2
(45) Date of Patent: Aug. 26, 2025

(54) TONER SUPPLY DEVICE AND IMAGE FORMING APPARATUS

(71) Applicant: Kei Hasegawa, Kanagawa (JP)

(72) Inventor: Kei Hasegawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/605,875

(22) Filed: Mar. 15, 2024

(65) Prior Publication Data

US 2024/0319645 A1 Sep. 26, 2024

(30) Foreign Application Priority Data

Mar. 22, 2023 (JP) ................................. 2023-045645
Oct. 26, 2023 (JP) ................................. 2023-184210

(51) Int. Cl.
*G03G 15/00* (2006.01)
*G03G 15/08* (2006.01)

(52) U.S. Cl.
CPC ......... *G03G 15/50* (2013.01); *G03G 15/0877* (2013.01)

(58) Field of Classification Search
CPC . G03G 15/50; G03G 15/0877; G03G 15/0879
See application file for complete search history.

(56) References Cited

U.S. PATENT DOCUMENTS 9,389,538 B2 * 7/2016 Nakajima .......... G03G 15/0877
2011/0255888 A1 * 10/2011 Itoyama ............ G03G 15/0853 399/30
2016/0009113 A1 1/2016 Uetake

FOREIGN PATENT DOCUMENTS

JP 2005-164728 A 6/2005
JP 2011-175206 A 9/2011
JP 2013-250585 A 12/2013
JP 2014-195994 A 10/2014

* cited by examiner

*Primary Examiner* — Sandra Brase
(74) *Attorney, Agent, or Firm* — XSENSUS LLP

(57) ABSTRACT

A toner supply device includes toner containers each containing toner used to form a latent image on a latent-image bearer, and circuitry to perform toner supply control to supply toner from the toner containers to developing devices. In the toner supply device, the toner supply control includes repeating toner supply in which one of the toner containers supplying the toner is switched to another one of the toner containers when a supplying time to supply the toner from one of the toner containers to corresponding one of the developing devices exceeds a prescribed maximum supplying time. In the toner supply device, the prescribed maximum supplying time, in the toner supply performed for a first time after the toner supply control starts, is shorter than the prescribed maximum supplying time in the toner supply performed for a second time.

9 Claims, 13 Drawing Sheets

TONER SUPPLY DEVICE AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2023-045645 and 2023-184210, filed on Mar. 22, 2023, and Oct. 26, 2023, respectively, in the Japan Patent Office, the entire disclosures of which are hereby incorporated by reference herein.

BACKGROUND

Technical Field

Embodiments of the present disclosure relate to a toner supply device and an image forming apparatus.

Background Art

In the related art, toner supply devices have been proposed each of which is provided with a plurality of toner containers that contain toner used to form a latent image on a latent-image bearer. Such toner supply devices perform toner supply control in which toner is supplied from a plurality of toner containers to corresponding developing devices.

Moreover, such toner supply devices sequentially switch a plurality of toner containers that supply toner and supply toner step by step to the developing device that needs toner supply. Due to such a configuration, toner is not supplied to a plurality of toner containers at the same time.

SUMMARY

Embodiments of the present disclosure described herein provide a toner supply device including toner containers each containing toner used to form a latent image on a latent-image bearer, and circuitry to perform toner supply control to supply toner from the toner containers to developing devices. In the toner supply device, the toner supply control includes repeating toner supply in which one of the toner containers supplying the toner is switched to another one of the toner containers when a supplying time to supply the toner from one of the toner containers to corresponding one of the developing devices exceeds a prescribed maximum supplying time. In the toner supply device, the prescribed maximum supplying time, in the toner supply performed for a first time after the toner supply control starts, is shorter than the prescribed maximum supplying time in the toner supply performed for a second time.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
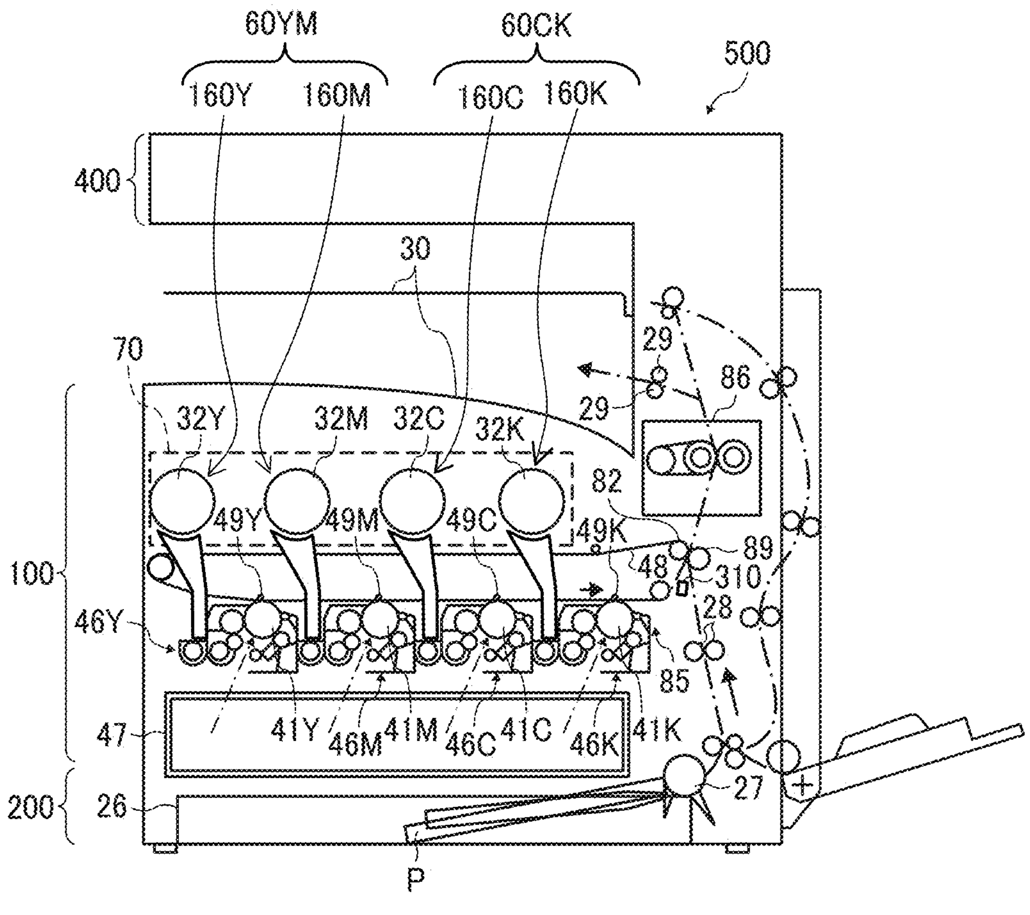
FIG. 1 is a schematic diagram of a copier according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to limit the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Some embodiments of the present disclosure are described below with reference to the drawings. Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims. The above-described embodiments are illustrative and do not limit the present disclosure.

A copier 500 according to an embodiment of the present disclosure that serves as an image forming apparatus is described below.

FIG. 1 is a schematic diagram of a copier 500 according to an embodiment of the present disclosure.

Typically, the copier 500 includes the printer unit 100, a sheet feeder 200, and an image reading unit 400 arranged above the printer unit 100. In the following description, the sheet feeder 200 may be referred to as a sheet feeding table.

A toner container mount 70 is arranged at an upper portion of the printer unit 100 to hold four detachable and replaceable toner containers 32Y, 32M, 32C, and 32K that serve as four powder containers and handle multicolor toner including yellow (Y), magenta (M), cyan (C), and black (BK). An intermediate transfer unit 85 is arranged below the toner container mount 70.

The intermediate transfer unit 85 according to the present embodiment includes, for example, an intermediate transfer belt 48, four primary-transfer bias rollers 49Y, 49M, 49C, and 49K, a secondary-transfer backup roller 82, a plurality of tension rollers, and an intermediate-transfer cleaning device. The intermediate transfer belt 48 is stretched and supported by the above-described multiple rollers, and is seamlessly moved in the direction indicated by an arrow in FIG. 1 as the secondary-transfer backup roller 82, which is one of the multiple rollers, is driven to rotate.

In the printer unit 100, four image forming units 46Y, 46M, 46C, and 46K that handle toner images of different colors including yellow, magenta, cyan, and black colors are arranged in parallel, so as to face the intermediate transfer belt 48.

The printer unit 100 further includes an exposure device 47 as a latent image forming unit below the four image forming units 46. The exposure device 47 according to the present embodiment exposes the surface of a photoconductor 41 as will be described later in detail to form an electrostatic latent image on the surface of the photoconductor 41, based on the image data of document images read by the scanner unit 400 or the image data that is input from an external device such as a personal computer (PC). Although the exposure device 47 provided for the printer unit 100 according to the present embodiment employs laser beam scanning using a laser diode, a different method that employs, for example, a light-emitting diode (LED) array may be adopted.

Figure 2:
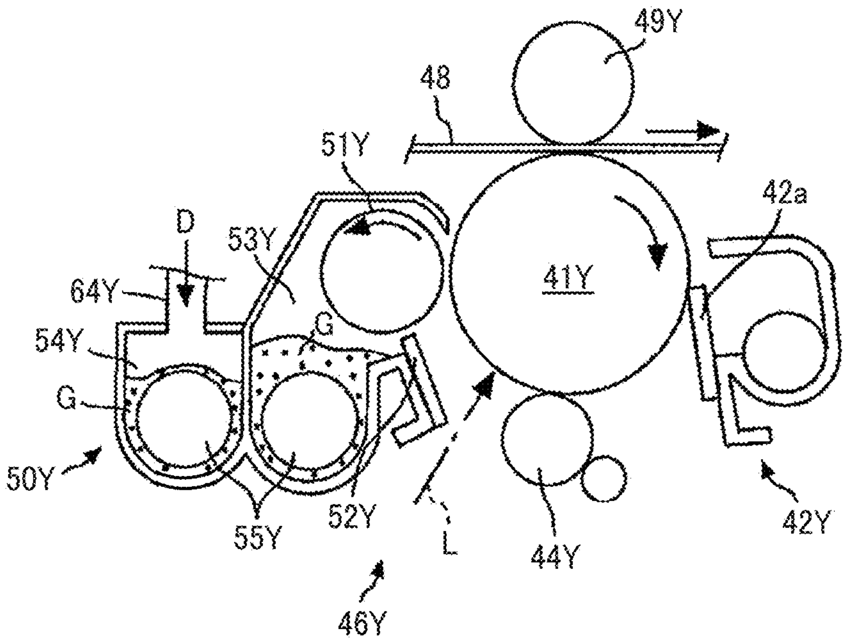
FIG. 2 is a diagram illustrating a schematic configuration of an image forming unit that handles a yellow toner image, according to an embodiment of the present disclosure.

FIG. 2 is a diagram illustrating a schematic configuration of the image forming unit 46Y that handles the yellow toner image, according to the present embodiment.

The image forming unit 46Y includes a photoconductor 41Y that is shaped like a drum and serves as a latent image bearer. In the image forming unit 46Y, for example, a charging roller 44Y that serves as a charging device, a developing device 50Y, a photoconductor cleaning device 42Y to clean the photoconductor 41Y, and an electric-charge removing device are arranged around the photoconductor 41Y. A series of image forming processes including a charging process, an exposure process, a developing process, a transfer process, and a cleaning process are performed on the photoconductor 41Y. As a result, a yellow toner image is formed on the surface of the photoconductor 41Y.

As illustrated in FIG. 2, the developing device 50Y according to the present embodiment includes, for example, a developing roller 51Y, a doctor blade 52Y, and a pair of developer conveying screws 55Y. The developing roller 51Y faces the photoconductor 41Y, and the doctor blade 52Y faces the developing roller 51Y. The two developer conveying screws 55Y are arranged inside two developer storages including a first developer storage 53Y and a second developer storage 54Y. The developing roller 51Y includes, for example, a stationary inner magnet roller (or multiple magnets) and a sleeve that rotates around the magnet roller. The first developer storage 53Y and the second developer storage 54Y store developer G containing two components including carriers and toner. The second developer storage 54Y communicates, through an opening on the upper side thereof, with a downward toner conveyance path 64Y.

Inside the developing device 50Y, the developer G is stirred by the two developer conveying screws 55Y and circulated between the first developer storage 53Y and the second developer storage 54Y. While being conveyed by one of the pair of developer conveying screws 55Y, the developer G in the first developer storage 53Y is attracted by the magnetic fields generated or formed by the magnet roller inside the developing roller 51Y, and is fed and borne onto the sleeve surface of the developing roller 51Y. The sleeve of the developing roller 51Y is driven to rotate in the counterclockwise direction as indicated by an arrow in FIG. 2, and the developer G that is borne on the developing roller 51Y moves on the developing roller 51Y with the rotation of the sleeve. Under such conditions, the toner particles in the developer G are charged through friction with carrier particles in the developer G to have a potential in the reversed polarity of the polarity of the carrier particles. Then, the toner particles are electrostatically attracted to the carrier particles, and are borne on the developing roller 51Y together with the carrier particles attracted by the magnetic field generated or formed on the developing roller 51Y.

The developer G that is borne on the developing roller 51Y is conveyed in a direction indicated by an arrow in FIG. 2 to a gap between the doctor blade 52Y and the developing roller 51Y. When the developer G on the developing roller 51Y passes through the portion, the amount of the developer G is optimized, and then the developer G is conveyed to a developing region which is a position facing the photoconductor 41Y. In the developing area, the toner in the developer G adheres to the latent image formed on the photoconductor 41Y due to the effect of the developing electric field generated between the developing roller 51Y and the photoconductor 41Y. As the sleeve rotates, the developer G that has passed through the developing region and remains on the surface of the developing roller 51Y reaches an area above the first developer storage 53Y and then drops from the developing roller 51Y.

The concentration of toner in the developer G that is contained in the developing device 50Y is adjusted within a predetermined range. More specifically, a toner supply device as will be described later in detail supplies the toner from the toner container 32Y to the second developer storage 54Y according to the consumption of the toner included in the developer G in the developing device 50Y. The toner that is supplied to the second developer storage 54Y is circulated by the pair of developer conveying screws

55Y between the first developer storage 53Y and the second developer storage 54Y while being mixed with the developer G and stirred.

The other three image forming units 46M, 46C, and 46K have a similar configuration to that of the yellow image forming unit 46Y except for the color of the toner used therein and form toner images of the respective colors on the photoconductors 41M, 41C, and 41K. In the following description, only the image forming unit 46Y that handles yellow toner is described, and the description of the other three image forming units 46M, 46C, and 46K are omitted where appropriate.

As illustrated in FIG. 2, the photoconductor 41Y is driven to rotate in a clockwise direction. The surface of the photoconductor 41Y is then evenly charged by the charging roller 44Y at a position facing the charging roller 44Y. Such a process is referred to as a charging process. When the photoconductor 41Y reaches a position to receive the laser beam L emitted from an exposure device 47, the photoconductor 41Y is scanned with the laser beam L, and thus an electrostatic latent image for yellow is formed thereon. Such a process is referred to as an exposure process. Then, the photoconductor 41Y reaches a position facing the developing device 50Y, where the electrostatic latent image is developed with yellow toner into a yellow toner image. Such a process is referred to as a developing process.

The four primary-transfer bias rollers 49Y, 49M, 49C, and 49K of the intermediate transfer unit 85 sandwich the intermediate transfer belt 48 with the corresponding photoconductors 41Y, 41M, 41C, and 41K, respectively, to form primary transfer nips therebetween. To the primary-transfer bias rollers 49Y, 49M, 49C, and 49K, a primary transfer bias whose polarity is opposite to the polarity of the electric charge of the toner is applied.

When the surface of the photoconductor 41Y on which the toner image has been formed in the developing process reaches the position facing the primary-transfer bias roller 49Y across the intermediate transfer belt 48, the toner image is transferred from the photoconductor 41Y onto the intermediate transfer belt 48 in the primary transfer nip. Such a transferring process is referred to as a primary transferring process. In this step, a small amount of toner remains untransferred on the photoconductor 41Y. After the toner image is transferred onto the intermediate transfer belt 48 at the primary transfer nip, the surface of the photoconductor 41Y reaches a position facing the photoconductor cleaning device 42Y. The untransferred toner that remains on the photoconductor 41Y at the facing position is mechanically collected by the cleaning blade 42*a*. Such a process may be referred to as a cleaning step in the following description. Finally, the surface of the photoconductor 41Y reaches a position facing the electric-charge removing device, and the residual potential on the photoconductor 41Y is removed at that position. In this way, a series of image forming processes performed on the photoconductor 41Y is completed.

Such a series of image forming processes is also performed in the other image forming units 46M, 46C, and 46K in a similar manner to the image forming unit 46Y that handles yellow toner. In other words, the exposure device 47 disposed below the image forming units 46M, 46C, and 46K irradiates photoconductors 41M, 41C, and 41K of the image forming units 46M, 46C, and 46K with laser beams L based on image data. More specifically, the exposure device 47 includes light sources to emit the laser beams L, a plurality of optical elements, and a polygon mirror that is rotated by a motor. The exposure device 47 uses the optical elements to irradiate the photoconductors 41M, 41C, and 41K with the laser beams L while deflecting the laser beams L with a polygon mirror. Then, after the developing process, the multicolor toner images are transferred from the photoconductors 41M, 41C, and 41K onto the intermediate transfer belt 48 and superimposed on top of one another While rotating and moving in the direction indicated by the arrow illustrated in FIG. 1, the intermediate transfer belt 48 sequentially passes through the primary transfer nips of the primary-transfer bias rollers 49Y, 49M, 49C, and 49K. Thus, multicolor toner images including yellow, magenta, cyan, and black toner images are primarily transferred from the photoconductors 41Y, 41M, 41C, and 41K to the intermediate transfer belt 48 on top of one another to form a color toner image on the intermediate transfer belt 48.

The intermediate transfer belt 48, to which a color toner image has been formed upon transferring multicolor toner images thereto and superimposing those toner images on top of one another, reaches a position facing a secondary transfer roller 89 arranged opposite the secondary-transfer backup roller 82. At this position, the secondary-transfer backup roller 82 sandwiches the intermediate transfer belt 48 with the secondary transfer roller 89 to form a secondary transfer nip. The color toner image that is borne on the intermediate transfer belt 48 is transferred onto the sheet P such as a transfer sheet conveyed to the position of the secondary transfer nip. In such a transferring process, the untransferred toner that failed to be transferred to the sheet P remains on the intermediate transfer belt 48. The intermediate transfer belt 48 having passed through the secondary transfer nip reaches the position of an intermediate transfer cleaning device, and untransferred toner on the surface of the intermediate transfer belt 48 is collected. Thus, a series of transfer processes that are performed on the intermediate transfer belt 48 ends.

The movement of the sheet P is described below. The sheet P is conveyed from a sheet tray 26 of a sheet feeder 200 arranged below the printer unit 100 to the above-described secondary transfer nip through, for example, a sheet feed roller 27 and a registration roller pair 28. More specifically, a plurality of sheets P are stacked and stored in the sheet tray 26. When the sheet feed roller 27 is driven to rotate counterclockwise in FIG. 1, the uppermost sheet P is conveyed toward a roller nip formed by two rollers of the registration roller pair 28.

The sheet P that is conveyed to the registration roller pair 28 stops moving at the roller nip of the registration roller pair 28 that stops rotating temporarily. The registration roller pair 28 is driven to rotate in accordance with the timing at which the color toner image on the intermediate transfer belt 48 reaches the secondary transfer nip. Accordingly, the sheet P is conveyed toward the secondary transfer nip. Thus, a multicolor toner image is transferred onto the sheet P as desired.

The sheet Ponto which the color toner image has been transferred at the secondary transfer nip is conveyed to the position of a fixing device 86. In the fixing device 86, the color toner image transferred to the surface of the sheet P is fixed onto the recording medium P by heat and pressure from a fixing belt and a pressure roller. The sheet P having passed through the fixing device 86 is ejected to the outside of the copier 500 through the rollers of an output roller pair 29. The sheet P ejected to the outside of the copier 500 by the output roller pair 29 is sequentially stacked on the stacking unit 30 as an output image. Thus, a series of image forming processes performed in the copier 500 is completed.

The printer unit 100 according to the present embodiment is provided with a pair of toner supply devices. One of the pair of toner supply devices is a yellow (Y) and magenta (M) color toner supply device 60YM that supplies toner to the developing device 50Y of the image forming unit 46Y and the developing device 50M of the image forming unit 46M. The other one of the pair of toner supply devices is a cyan (C) and black (K) color toner supply device 60CK that supplies toner to the developing device 50C of the image forming unit 46C and the developing device 50K of the image forming unit 46K.

The YM color toner supply device 60YM includes a yellow (Y) color toner supply unit 160Y that supplies the toner of yellow (Y) color stored in the yellow (Y) color toner container 32Y, which serves as a toner container containing yellow (Y) color toner, to the developing device 50Y that handles yellow (Y) color toner. The YM color toner supply device 60YM includes a magenta (M) color toner supply unit 160M that supplies the magenta (M) color toner stored in the magenta (M) color toner container 32M, which serves as a toner container containing magenta (M) color toner, to the developing device 50M that handles magenta (M) color toner.

The CK color toner supply device 60CK is provided with a C color toner supply unit 160C that supplies the toner of cyan (C) color to the developing device 50C that handles the cyan (C) color toner stored in the cyan (C) color toner container 32C that serves as a toner container that contains cyan (C) color toner container. The CK color toner supply device 60CK is provided with a K color toner supply unit 160K that supplies the toner of black (K) color to the developing device 50K that handles the black (K) color toner stored in the black (K) color toner container 32K that serves as a toner container that contains black (K) color toner. The toner supply devices will be described later in detail.

The printer unit 100 according to the present embodiment is provided with a toner adhesion-amount sensor 310 that serves as a density sensor and detects the density of the toner image formed on the outer circumferential surface of the intermediate transfer belt 48. For example, for-detection image patterns are formed on the surface of the intermediate transfer belt 48 at prescribed timings during continuous printing or every time a predetermined number of sheets are printed, and the amount of adhered toner in the image patterns is detected by the toner adhesion-amount sensor 310. Subsequently, the image-forming condition such as a developing bias is individually adjusted based on the results of detection for each one of the image forming units, or forced toner supply control as will be described later in detail is performed.

Figure 3:
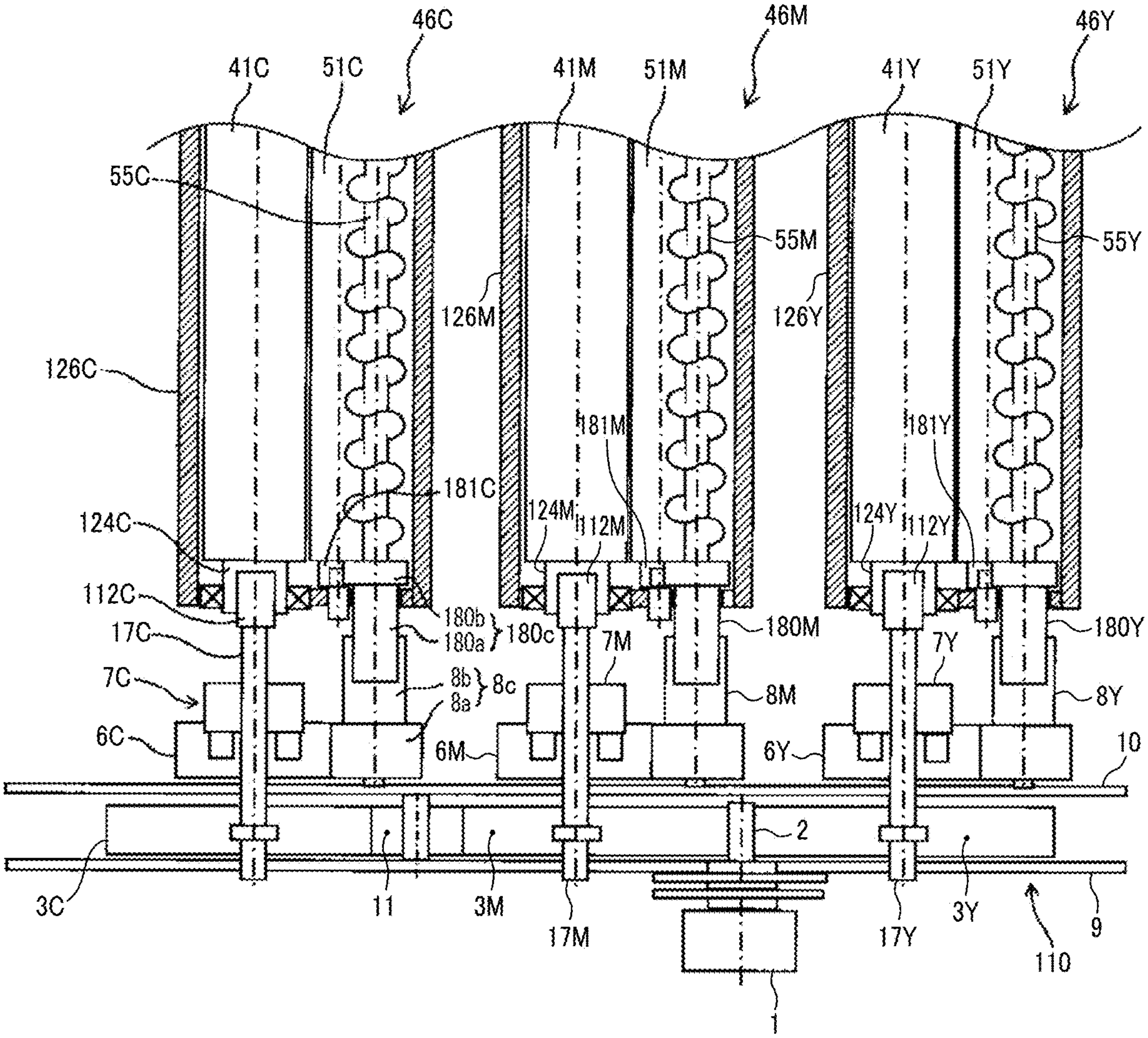
FIG. 3 is a schematic sectional view of a color-printing driver device according to an embodiment of the present disclosure.

FIG. 3 is a schematic sectional view of a color-printing driver device that drives color photoconductors 41C, 41M, and 41Y and the rotors of the color developing devices 50Y, 50M, and 50C including the developing roller 51 and the developer conveying screw 55, according to the present embodiment.

The transmission mechanisms of the driving force of the multiple image forming units are substantially equivalent to each other. In view of these circumstances, only the transmission mechanism of the driving force of the image forming unit 46C that handles cyan (C) color toner is described.

The color-printing driver device 110 according to the present embodiment is provided with a color image-forming motor 1, and the color image-forming motor 1 is fixed to the surface of the bracket 9 on the other side of the processing unit. The motor axis of the color image-forming motor 1 penetrates the bracket 9. Teeth are formed on the circumferential surface of the motor shaft to form a motor gear 2.

Between the bracket 9 and a side panel 10 on the recess side facing the surface of the bracket 9 on the processing unit side, a photoconductor gear 3Y for yellow (Y) color, a photoconductor gear 3M for magenta (M) color, a photoconductor gear 3C for cyan (C) color, and an idler gear 11 are arranged. The photoconductor gear 3Y of yellow (Y) color and the photoconductor gear 3M of magenta (M) color engages with the motor gear 2 of the color image-forming motor 1. The idler gear 11 according to the present embodiment engages with the photoconductor gear 3M for magenta (M) color and the photoconductor gear 3C for cyan (C) color.

The multiple photoconductor gears 3Y, 3M, and 3C are fixed to the rotation axes 17Y, 17M, and 17C that are rotatably supported by the bracket 9 and the side panel 10 on the recess side. To the ends of the multiple rotation axes 17Y, 17M, and 17C, driving photoconductor joints 112Y, 112M, and 112C are attached. The multiple rotation axes 17Y, 17M, and 17C are provided with electromagnetic clutches 7Y, 7M, and 7C and development output gears 6Y, 6M, and 6C.

The color-printing driver device 110 according to the present embodiment is provided with driving development gears 8Y, 8M, and 8C, and the multiple driving development gears 8Y, 8M, and 8C are rotatably supported by the support axes arranged on the side panel 10 on the recess side. In the driving development gears 8Y, 8M, and 8C, a plurality of driving development joints 8*b* and a plurality of development gears 8*a* that engage with the development output gears 6Y, 6M, and 6C are formed as a single integrated unit.

At the ends of the photoconductors 41Y, 41M, and 41C on the recess side, driven photoconductor joints 124Y, 124M, and 124C that are coupled to the driving photoconductor joints 112Y, 112M, and 112C are arranged. Those driven photoconductor joints 124Y, 124M, and 124C are supported by a plurality of cases 126Y, 126M, and 126C of the image forming unit in a pivotable manner through a bearing.

At the ends on the recess side, the developer conveying screws 55Y, 55M, and 55C of the developing devices 50Y, 50M, and 50C are provided with driven development gears 180Y, 180M, and 180C are arranged in which a driven gear 180*b* and a driven development joint 180*a* are formed as a single integrated unit. The developing roller 51Y and developing rollers 51M and 51C are provided with developing roller gears 181Y, 181M, and 181C at their ends on the recess side. The developing roller gears 181Y, 181M, and 181C engage with the driven gears 180*b* of the driven development gears 180Y, 180M, and 180C. The driven development joints 180*a* are connected to the driving development joints 8*b* of the driving development gears 8Y, 8M, and 8C.

As illustrated in FIG. 3, the color photoconductors 41C, 41M, and 41Y and the color developing devices 50Y, 50M, and 50C are all driven to rotate by the color image-forming motor 1 that is a single unit of motor. Due to such a configuration, the number of motors can be reduced, and the manufacturing cost of the toner supply device or the image forming apparatus can be reduced. In regard to black (K) color toner, the photoconductor 41K and the multiple rotors of the developing device 50K including the developing roller 51 and the developer conveying screw 55 are driven to rotate by a monochrome image-forming motor.

The toner supply devices are described below in detail. As described above, the toner supply devices according to the present embodiment include the YM color toner supply device 60YM that supplies the developing device 50Y that handles yellow (Y) color toner and the toner to the developing device 50M that handles magenta (M) color toner and the CK color toner supply device 60CK that supplies the developing device 50C that handles cyan (C) color toner and the toner to the developing device 50K that handles black (K) color toner. The YM color toner supply device 60YM has a configuration or structure similar to that of the CK color toner supply device 60CK, except for the kind of toner to be supplied. Accordingly, only the CK color toner supply device 60CK is referred to in the following description of the present disclosure.

Figure 4:
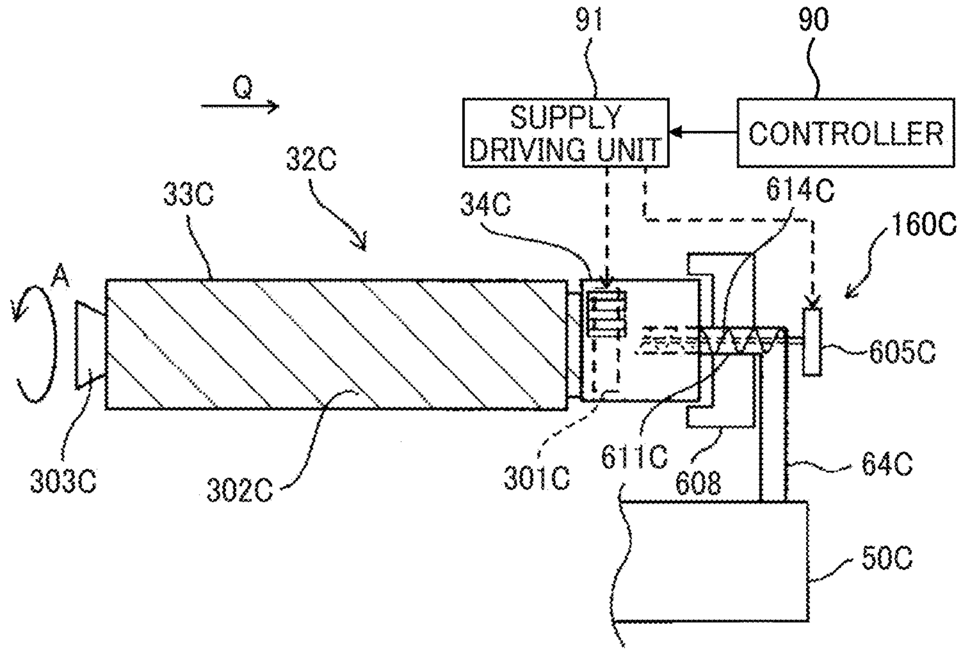
FIG. 4 is a schematic diagram of a C color toner supply unit of a cyan (C) and black (K) color toner supply device, according to an embodiment of the present disclosure.

FIG. 4 is a schematic diagram of the C color toner supply unit 160C of the CK color toner supply device 60CK, according to the present embodiment.

Figure 5:
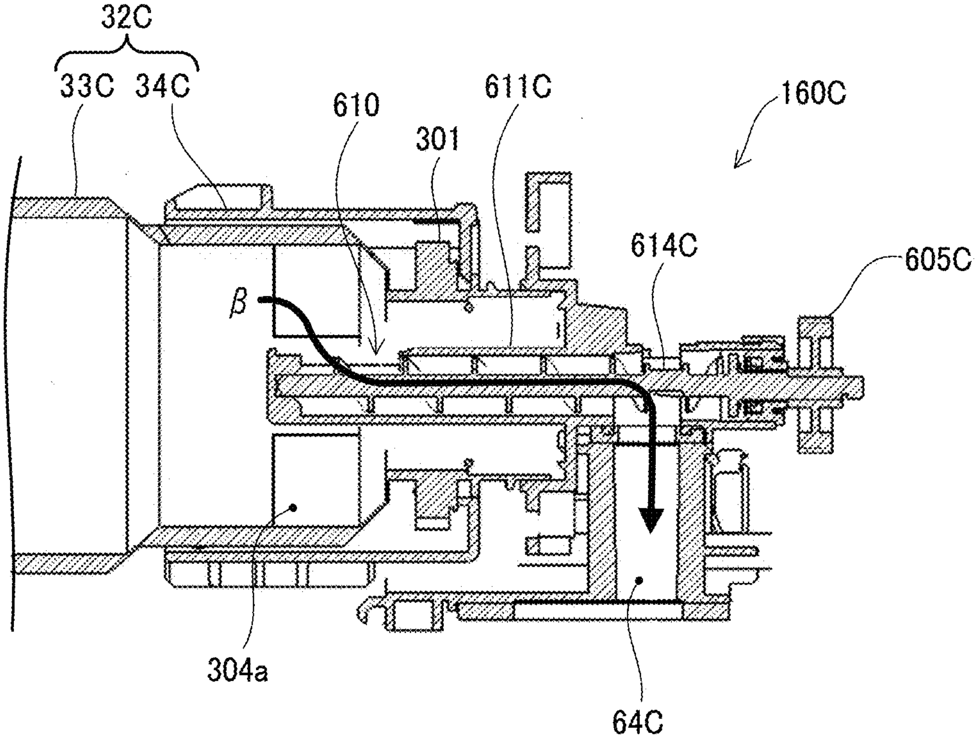
FIG. 5 is a schematic partial sectional view of a C color toner supply unit according to an embodiment of the present disclosure.

FIG. 5 is a schematic partial sectional view of the C color toner supply unit 160C, according to the present embodiment.

The K color toner supply unit 160K has a configuration or structure similar to that of the C color toner supply unit 160C. The Y color toner supply unit 160Y and the M color toner supply unit 160M of the YM color toner supply device 60YM have a configuration or structure similar to that of the C color toner supply unit 160C.

The C color toner supply unit 160C includes, for example, a conveyance nozzle 611C that serves as a conveyance pipe, a toner conveying screw 614C, and the downward toner conveyance path 64C. Once the toner container 32C moves in the direction of arrow Q as illustrated in FIG. 4 and is mounted on the toner container mount 70 (see FIG. 1) of the printer unit 100, the conveyance nozzle 611C of the toner supply device 60C is inserted from the front end of the toner container 32C in conjunction with the mounting operation. By so doing, the interior of the toner container 32C communicates with the conveyance nozzle 611C.

The toner container 32C according to the present embodiment is an approximately cylindrical toner bottle. Typically, the toner container 32C includes a front-end container cover 34C held in the toner container mount 70 (see FIG. 1) in an irrotational manner, and a container body 33C integrally molded with a container gear 301C. The container body 33C is held to be rotatable relative to the front-end container cover 34C.

As the container gear 301C provided for the container body 33C is driven to rotate by a supply driving unit 91 as will be described later in detail, the container body 33C is driven to rotate in the direction indicated by arrow A illustrated in FIG. 4. As the container body 33C itself rotates, by a spiral rib 302C that is formed on the inner circumference of the container body 33C to have a helical shape, the toner stored inside the container body 33C is conveyed in the longitudinal direction of the container body 33C from the left to the right as illustrated in FIG. 4.

On the right side of the container body 33C near the front-end container cover 34C as illustrated in FIG. 4, a pump-up unit 304*a* is provided that pumps the toner that is conveyed toward the front-end container cover 34 upward by the rotation of the container body 33C. The pump-up unit 304*a* pumps up the toner above the conveyance nozzle 611C that is inserted into the toner container 32C, and the toner drops into a nozzle hole 610 arranged at the end of the conveyance nozzle 611C near the toner container 32C. As a result, the toner is supplied to the conveyance nozzle 611C.

The toner conveying screw 614C is arranged inside the conveyance nozzle 611C, and the supply driving unit 91 drives the conveying screw gear 605C to rotate. As a result, the toner conveying screw 614C is driven to rotate to convey the toner supplied to the conveyance nozzle 611C. The downstream end of the conveyance nozzle 611C in the conveyance direction is connected to the downward toner conveyance path 64C. The toner that is conveyed by the toner conveying screw 614C falls off by its own weight along the downward toner conveyance path 64C, and is supplied to the developing device 50C.

As illustrated in FIG. 4, the supply driving unit 91 is controlled by the controller 90. As the toner conveying screw 614C that is arranged inside the conveyance nozzle 611C is driven to rotate, the toner is supplied. For this reason, the controller 90 can calculate the amount of toner supply from the toner container 32C and the amount of toner supply to the developing device based on the revolutions per minute (rpm) of the toner conveying screw 614C and the drive time of the toner conveying screw 614C. As the revolutions per minute (rpm) of the toner conveying screw 614C is constant in the present embodiment, the controller 90 estimates the amount of toner supply based on the drive time of the toner conveying screw 614C. More specifically, the controller 90 estimates the amount of the toner that remains in the toner container based on the accumulated drive time, and predicts a toner end in which no toner is left in the toner container. When it is determined that the toner end has come, the controller 90 controls the display unit of the copier 500 to display a message prompting a replacement of the toner container. By driving the toner conveying screw to rotate for a desired driving time, a desired amount of toner is supplied to each developing device.

Figure 6:
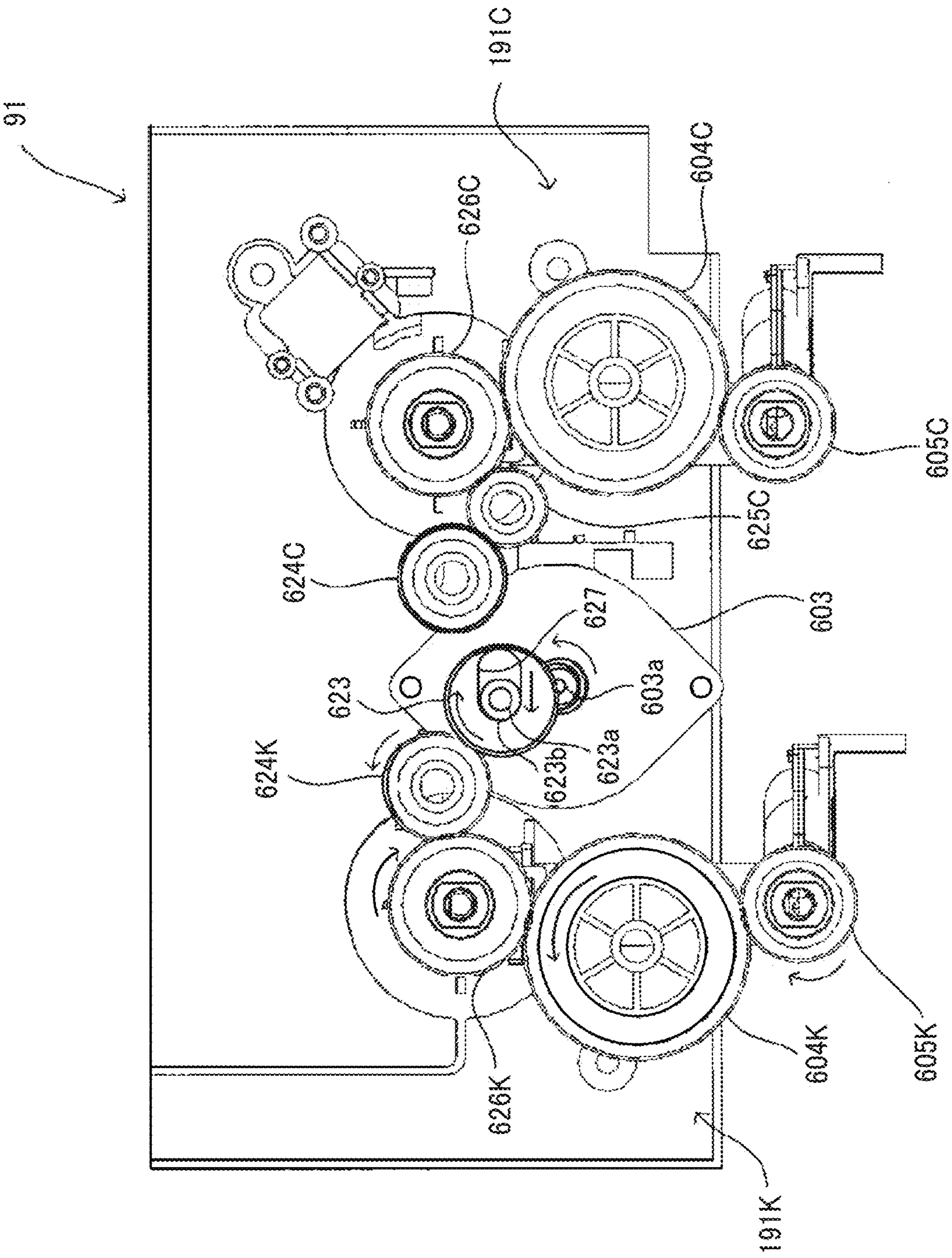
FIG. 6 is a schematic diagram illustrating how driving force is conveyed to a K color toner supply unit, according to an embodiment of the present disclosure.
Figure 7:
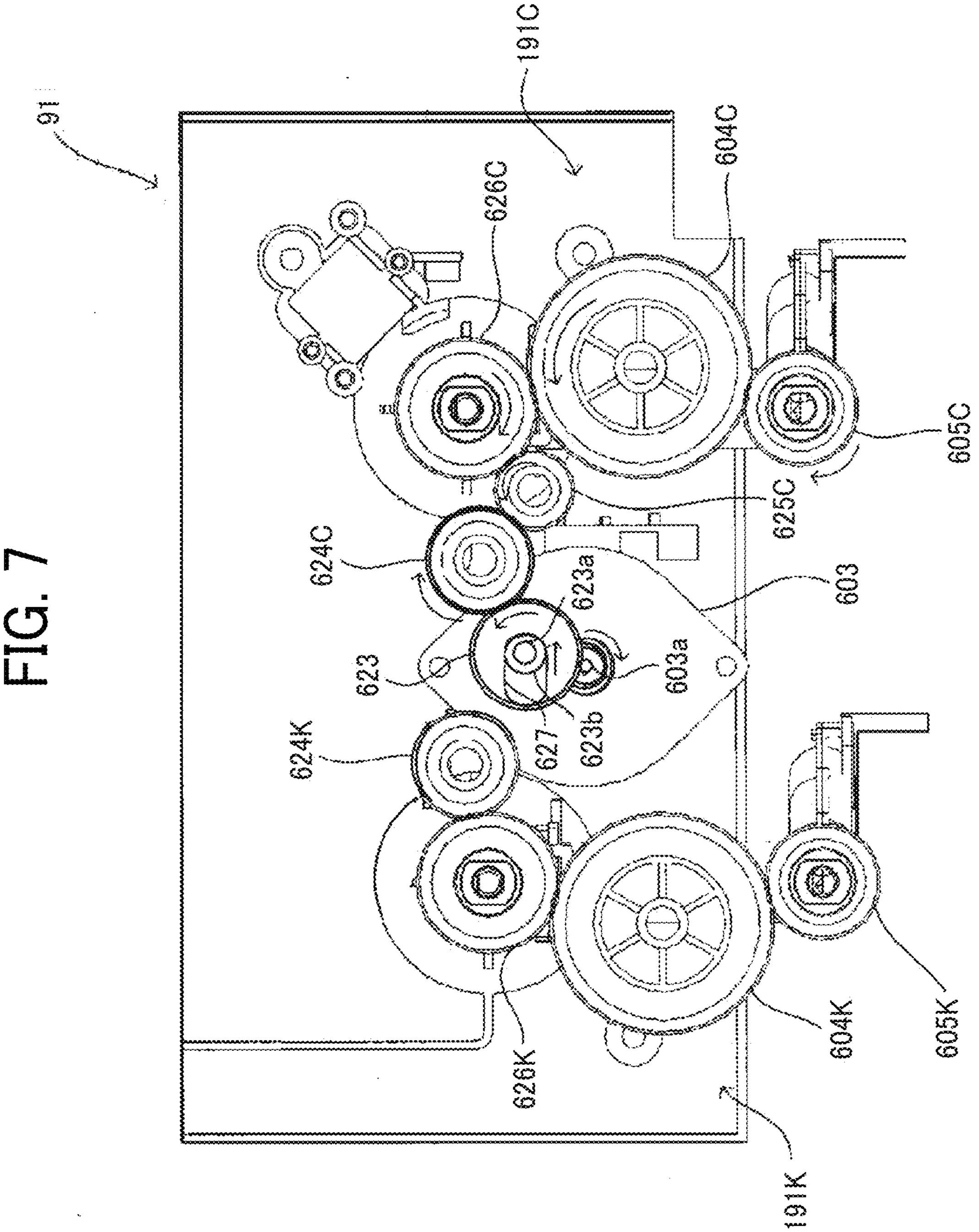
FIG. 7 is a schematic diagram illustrating how the driving force is conveyed to a C color toner supply unit, according to an embodiment of the present disclosure.

The supply driving unit 91 of the CK color toner supply device 60CK is described below. FIG. 6 and FIG. 7 are schematic diagrams each of which illustrates the supply driving unit 91, according to the present embodiment.

FIG. 6 is a schematic diagram illustrating how driving force is conveyed to the K color toner supply unit 160K, according to the present embodiment.

FIG. 7 is a schematic diagram illustrating how the driving force is conveyed to the C color toner supply unit 160C, according to the present embodiment.

Typically, the supply driving unit 91 is provided with a supply motor 603 such as a stepping motor, the K color drive transmission unit 191K, a cyan (C) color drive transmission unit 191C, and the switching gear 623.

The switching gear 623 engages with the motor gear 603*a* of the supply motor 603. The rotation axis 623*a* of the switching gear 623 is supported through the bearing 623*b* by a long hole 627 that is formed on a board on the image forming apparatus side and extends in the right and left directions as illustrated in FIG. 6 or FIG. 7. As illustrated in FIG. 6, when the driving force is conveyed to the K color toner supply unit 160K for black (K) color toner, the bearing 623*b* contacts the left end of the long hole 627 as illustrated in FIG. 6, and the switching gear 623 engages with the input gear 624K of the K color drive transmission unit 191K.

By contrast, as illustrated in FIG. 7, when the driving force is conveyed to the C color toner supply unit 160C for cyan (C) color, the bearing 623*b* contacts the right end of the long hole 627 as illustrated in FIG. 7, and the switching gear 623 engages with the input gear 624C of the C color drive transmission unit 191C.

Typically, the K color drive transmission unit 191K includes an input gear 624K, a bottle drive gear 626K, an idler gear 604K, and a conveying screw gear 605K. The bottle drive gear 626K is fixed to the axis of a bottle input gear that engages with the container gear 301 (see FIG. 4), and engages with the input gear 624K and the idler gear 604K. The conveying screw gear 605K engages with the idler gear 604K.

The C color drive transmission unit 191C includes the input gear 624C, a bottle drive gear 626C, an idler gear 604C, and the conveying screw gear 605C. Moreover, the C color drive transmission unit 191C includes an input idler gear 625C that engages with the input gear 624C and the bottle drive gear 626C. Due to such a configuration, the rotation directions of the container bodies 33K and 33C can be made parallel to the rotation directions of the toner conveying screws 614K and 614C.

When the toner is supplied to the developing device 50K that handles black (K) color toner, the controller 90 causes the supply motor 603 to rotate in a counterclockwise direction as illustrated in FIG. 6. Then, force is applied leftward from the motor gear 603*a* to the switching gear 623, and the switching gear 623 moves inside the long hole 627 toward the leftward as illustrated in FIG. 6 or FIG. 7 and engages with the input gear 624K of the K color drive transmission unit 191K. As a result, the driving force of the supply motor 603 is conveyed to the K color drive transmission unit 191K to drive the container body of the toner container 32K for black (K) color toner and the toner conveying screw 614K to rotate, and the toner of black (K) color toner is supplied to the developing device 50K that handles black (K) color toner.

By contrast, when the toner is supplied to the developing device 50C that handles cyan (C) color, the controller 90 drives the supply motor 603 to rotate in a clockwise direction as illustrated in FIG. 7, which is reverse to the rotation direction when the black (K) color toner is supplied. Then, force is applied rightward from the motor gear 603*a* to the switching gear 623, and the switching gear 623 moves inside the long hole 627 toward the rightward as illustrated in FIG. 6 and engages with the input gear 624C of the C color drive transmission unit 191C (see FIG. 7). Due to such a configuration, the driving force of the supply motor 603 is conveyed to the C color drive transmission unit 191C to drive the container body 33C of the toner container 32C for cyan (C) color toner and the toner conveying screw 614C to rotate, and the toner of cyan (C) color is supplied to the developing device 50C that handles cyan (C) color toner.

As described above, according to the present embodiment, the pair of toner supply units can be driven by a single supply motor 603. Due to such a configuration, the manufacturing cost of the toner supply devices or the image forming apparatus can be reduced compared with toner supply devices or image forming apparatuses in which a supply motor is provided for every toner supply unit. In the present embodiment, the switching gear 623 that engages with the motor gear 603*a* is configured to be movable in the right and left directions as illustrated in FIG. 6 or FIG. 7 within a prescribed range. Due to such a configuration, just by switching the direction in which the supply motor is driven to rotate, the drive transmission can be switched between the K color drive transmission unit 191K and the C color drive transmission unit 191C. Accordingly, compared with a configuration in which, for example, an electromagnetic clutch is arranged to switch the drive transmission, the drive transmission can be switched at low cost.

Figure 8:
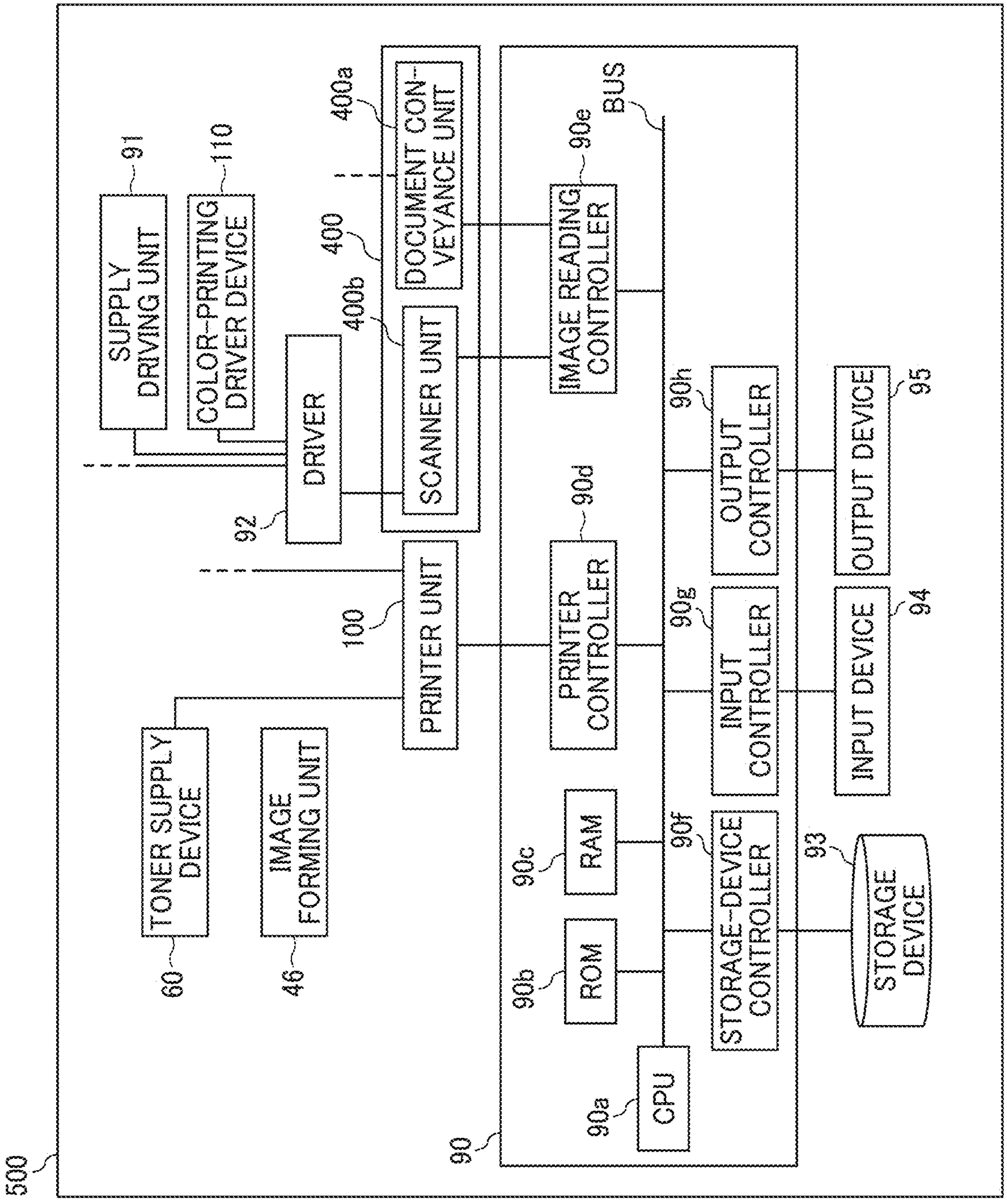
FIG. 8 is a diagram illustrating the hardware blocks of a copier according to an embodiment of the present disclosure.

FIG. 8 is a diagram illustrating the hardware blocks of the copier 500, according to the present embodiment.

The copier 500 according to the present embodiment is provided with the controller 90. The controller 90 includes a central processing unit (CPU) 90*a*, a read-only memory (ROM) 90*b*, a random-access memory (RAM) 90*c*, a printer controller 90*d*, an image reading controller 90*e*, a storage-device controller 90*f*, an input controller 90*g*, and an output controller 90*h*, and the elements of the controller 90 are connected to each other through a bus.

The printer controller 90*d* of the controller 90 serves as an interface for the CPU 90*a* to control the multiple hardware components of the printer unit 100 such as the multiple image forming units 46, the intermediate transfer unit 85, the exposure device 47, the fixing device 86, and the toner supply devices 60. The image reading controller 90*e* serves as an interface for the CPU 90*a* to control the scanner unit 400*b* and the document conveyance unit 400*a* of the image reading unit 400.

The storage-device controller 90*f* serves as an interface for the CPU 90*a* to control a storage device (memory) 93 provided for the copier 500. The input controller 90*g* serves as an interface for the CPU 90*a* to control the input device 94. The output controller 90*h* serves as an interface for the CPU 90*a* to control the output device 95.

The controller 90 that includes the CPU 90*a* controls the entirety of the copier 500. The CPU 90*a* starts the operating system (OS) using the boot program stored in the ROM 90*b*. On the OS, the CPU 90*a* executes the control program stored in the storage device 93 and the ROM 90*b*.

The RAM 90*c* is used as a temporary storage area such as a main memory or a work area of the CPU 90*a*. The storage device 93 is a readable/writable nonvolatile storage device such as a hard disk drive (HDD). In the storage device 93, various kinds of data such as programs or various types of application programs used to control the entirety of the copier 500, data used to manage consumable items, and moving images presenting a series of work required to solve maintenance events are stored. The CPU 90*a* accesses the storage device 93 using the storage-device controller 90*f*

The CPU 90*a* reads a control program or an application program from the storage device 93 or the ROM 90*b*, and executes the program developed in the RAM 90*c* to control the copier 500.

In the copier 500 according to the present embodiment, one CPU uses a program developed in one memory such as a RAM to execute the multiple processes in the flowcharts as will be described later in detail. However, no limitation is indicated thereby, and other kinds of modes may be adopted. For example, a plurality of processors, RAMs, ROMs, and storage devices may cooperate to execute the multiple processes in the flowcharts as will be described later in detail. Alternatively, some of the processes may be executed using hardware circuitry such as an application-specific integrated circuit (ASIC) or a field-programmable gate array (FPGA).

The CPU 90*a* according to the present embodiment controls the scanner unit 400*b* through the image reading controller 90*e* to scan images on the sheet of document and generate image data. The CPU 90*a* according to the present embodiment cooperates with the multiple units of hardware of the printer controller 90*d* and the printer unit 100 to form an image on a recording medium such as a sheet of paper.

The input controller 90*g* connects the input device 94 and the controller 90 to accept instructions given through the input device 94 such as a touch panel and hard keys. The output controller 90*h* connects the output device 95 and the controller 90, and controls the output device 95 provided with a display unit such as a liquid crystal display (LCD) and a cathode-ray tube (CRT) display to display an operation screen or moving images to a user. In the present embodiment, the output device 95 is described as a display unit that produces a visual output. However, no limitation is indicated thereby, and in addition to or in place of the visual output, the output device 95 may be provided with a loudspeaker that produces a voice output or audio output. In addition to or in place of, for example, a touch panel and hard keys, the input device 94 may be provided with a microphone through which a voice input is made.

As illustrated in FIG. 3, in the copier 500 according to the present embodiment, the photoconductors 41 and the rotors of the developing devices 50 (including the developing rollers 51 and the developer conveying screws 55) are driven by a single image-forming motor for the purposes of reducing the manufacturing cost of the toner supply devices or the image forming apparatus. When the toner is supplied to each of the developing devices 50, the developing devices 50 need to be driven to stir and convey the toner that is supplied to each of the developing devices 50 using the developer conveying screw 55. By so doing, the toner concentration in the developing devices 50 is made even. Under these circumstances, in the image forming apparatus according to the present embodiment where the photoconductors 41 and the rotors of the developing devices 50 including the developing roller 51 and the developer conveying screw 55 are driven by a single motor, the photoconductors 41 are also driven to rotate during the toner supply. For this reason, if the toner is supplied while an image is not being formed, the consumption of the photoconductors 41 speeds up, and the useful life of the photoconductors 41 is shortened. In order to handle such a situation, in the present embodiment, toner is supplied to each of the developing devices 50 during the image-forming operation.

Figure 9:
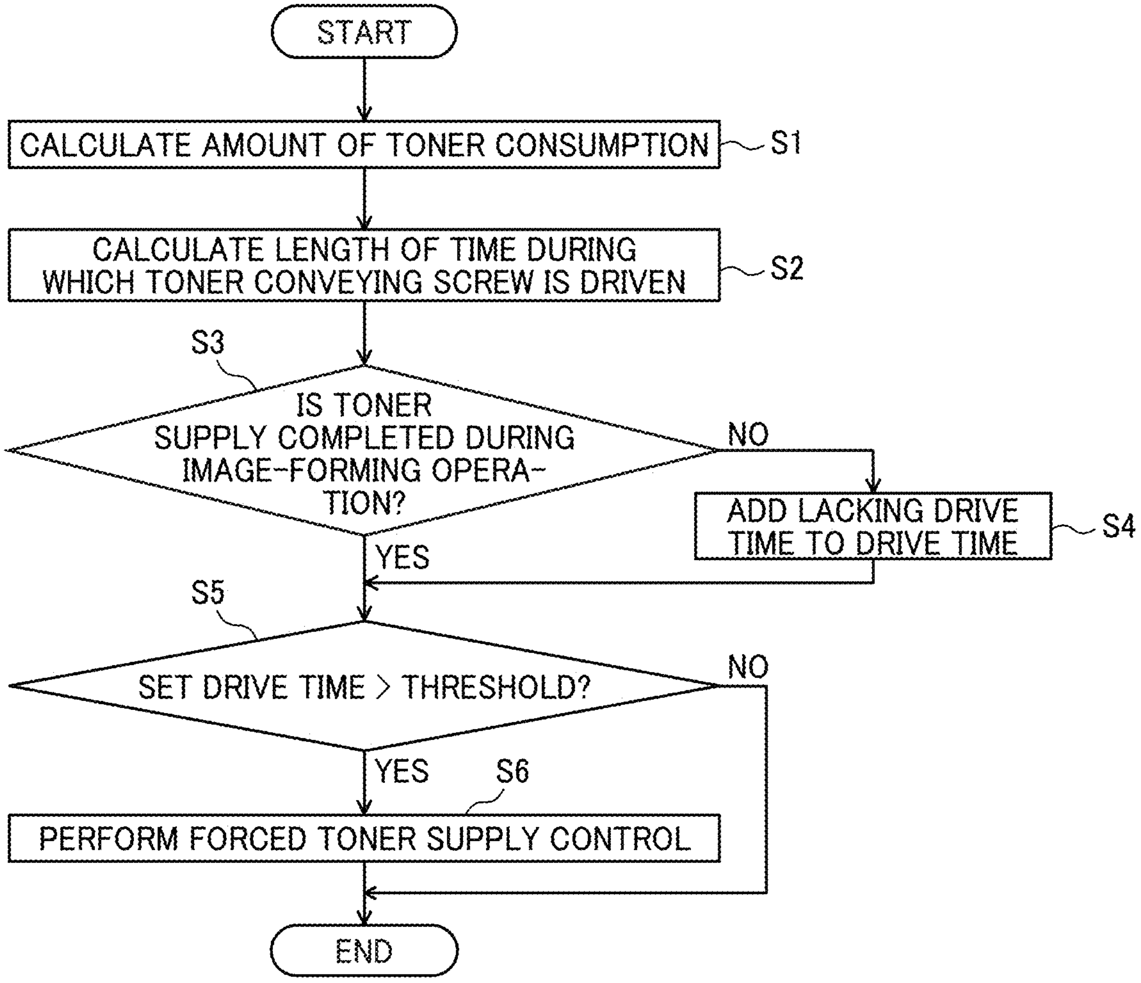
FIG. 9 is a flowchart of the processes of setting the drive time of a toner supply unit of each color, according to an embodiment of the present disclosure.

FIG. 9 is a flowchart of the processes of setting the drive time of a toner supply unit of each color or the drive time of the toner conveying screw 614 during the toner supply, according to the present embodiment.

Once the image-forming operation is completed, firstly, in step S1, the controller 90 (see FIG. 4) calculates the amount of the toner consumed during the current image-forming operation based on the image data used by the exposure device 47. There are some cases in which toner adheres to areas other than the areas for latent images on the photoconductors 41. For example, toner may adhere to areas outside the image-forming area on both sides of the photoconductors 41 in the axial direction as scumming. In order to handle such a situation, the controller 90 calculates the amount of the toner that adheres to areas outside the image-forming area as scumming based on the travel distance of the photoconductors 41 in the current image-forming operation, and adds the calculated amount of toner to amount of toner consumption.

Subsequently, in step S2, the controller 90 calculates the length of time during which toner conveying screws 614 are driven, based on the calculated amount of toner consumption. As described above, toner is supplied by driving the toner conveying screws 614 arranged inside the conveyance nozzles 611 to rotate. For this reason, by controlling the revolutions per minute (rpm) of the toner conveying screws 614 and the drive time of the toner conveying screws 614, a desired amount of toner can be supplied to the developing devices 50. As described above, the revolutions per minute (rpm) of the toner conveying screws 614 is constant in the present embodiment. In view of these circumstances, the drive time of the toner conveying screw 614 is set based on the calculated amount of consumed toner. By so doing, the toner of the amount of toner consumption can be supplied to each one of the developing devices 50.

Subsequently, in step S3, the controller 90 checks whether the toner supply is completed during the current image-forming operation. As described above, the toner supply device according to the present embodiment is configured to switch the rotation direction of the supply motor 603 to switch the toner supply unit to be driven. Due to such a configuration, in the CK color toner supply device 60CK, the K color toner supply unit 160K and the C color toner supply unit 160C are sequentially driven. For this reason, the length of time required to supply a desired amount of toner to each of the developing device 50K that handles black (K) color toner and the developing device 50C that handles cyan (C) color toner is defined as follows. In other words, the length of time required to supply a desired amount of toner is the total time of the drive time of the toner conveying screw 614K for black (K) color toner, which is set based on the amount of toner consumption, and the drive time of the toner conveying screw 614C for cyan (C) color toner, which is set based on the amount of toner consumption.

The toner supply available time that corresponds to the length of time of the image-forming operation varies depending on the number of sheets to be printed, the conveyance direction of the sheet P, or the length of the sheet P. For this reason, there are some cases in which the length of time of the image-forming operation becomes shorter than the above length of time required to supply toner. In such cases, the toner supply control is terminated when the image-forming operation is terminated, and there is some concern that a desired amount of toner cannot be supplied to the developing device.

In order to handle such a situation, when the toner supply is not completed during the current image-forming operation ("NO" in step S3), in step S4, the controller 90 adds the lacking drive time to the set drive time based on the amount of toner consumption. The lacking drive time is a value of the difference between the target drive time of the toner conveying screws 614 in the current toner supply control and the actual drive time of the toner conveying screws 614 in the current image-forming operation. The drive time to which the lacking drive time is added is stored in a nonvolatile memory as the drive time of the toner conveying screw, which corresponds to the amount of toner supply, in the toner supply control of the next image-forming operation.

By contrast, when the toner supply is completed during the current image-forming operation ("NO" in step S3), the drive time set in step S2 is determined to be the drive time of the toner conveying screw in the toner supply control of the next image-forming operation, and that drive time is stored in a nonvolatile memory.

Subsequently, in step S5, the controller 90 checks whether the drive time of the toner conveying screw in the toner supply control of the next image-forming operation exceeds the threshold. When the drive time exceeds the threshold, the degree of toner concentration in the developing device 50 may have decreased to a level at which a desired level of image density cannot be obtained. In order to handle such a situation, when the drive time exceeds the threshold ("YES" in step S5), in step S6, the controller 90 performs forced toner supply control, for example, before the next image-forming operation starts. In the forced toner supply control, the toner conveying screws are driven to rotate for a driving time equal to or exceeding the threshold. Due to such a configuration, image formation can be performed after the degree of toner concentration of the developer in the developing device 50 is recovered, and an image with a desired level of image density can be obtained.

For example, the developing device may be provided with a toner concentration sensor to detect the degree of toner concentration of the developer G, and the forced toner supply control may be performed when the degree of toner concentration of the toner concentration sensor becomes equal to or less than the threshold. In such a configuration, image patterns are at prescribed time intervals, and the amount of adhered toner in the image patterns is detected by the toner adhesion-amount sensor 310. When the amount of adhered toner in the image patterns falls below the threshold and the image density does not recover by adjusting the image-forming condition such as a developing bias, the forced toner supply control may be performed.

As the forced toner supply control is performed, the photoconductors 41 rotate in operations other than the image-forming operation. For this reason, when the forced toner supply control is performed frequently, the useful life of the photoconductors 41 is shortened. While the CK color toner supply device 60CK performs the toner supply in which the toner supply of black (K) color toner and the toner supply of cyan (C) color toner are sequentially performed only once during the image-forming operation and the drive time of the toner conveying screws for multicolor toner, which corresponds to the amount of toner supply is satisfied, there is some concern that the forced toner supply control is performed frequently. For this reason, it is desired that the length of time of the toner supply by the CK color toner supply device 60CK be shortened and the toner supply be performed a plurality of times. By so doing, the drive time of the toner conveying screws for multicolor toner, which corresponds to the amount of toner supply is satisfied.

Figure 10A:
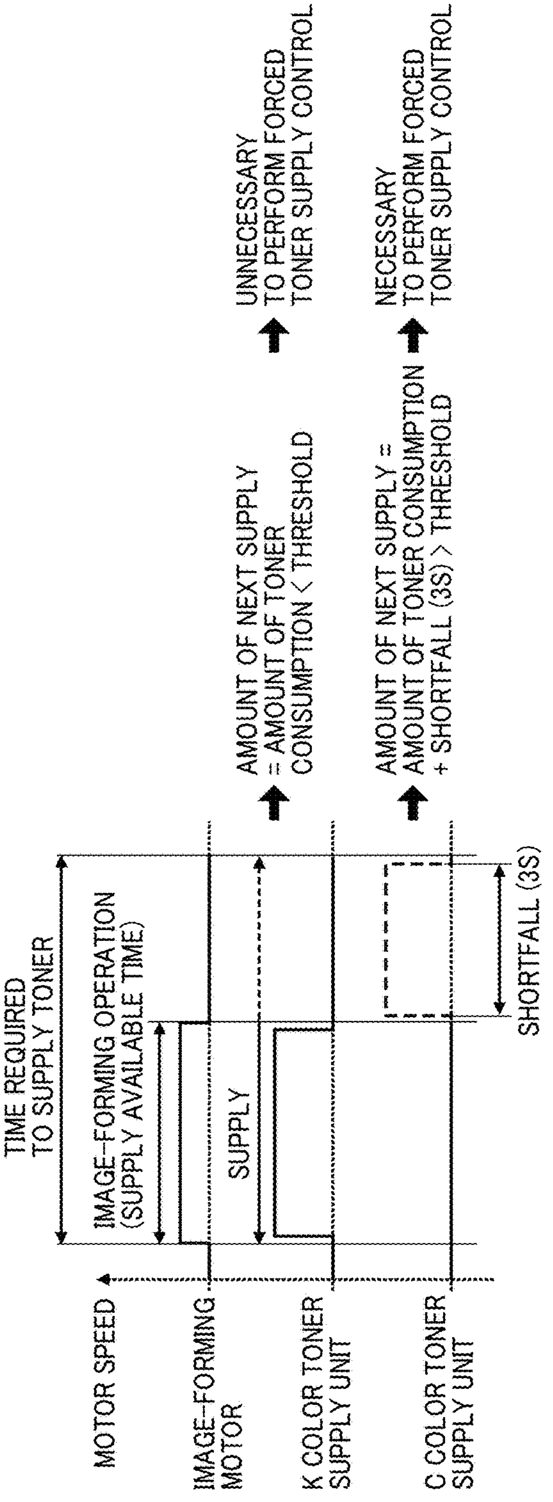
FIG. 10A is a timing chart of toner supply control in which a desired amount of toner is supplied to each developing device in one-time toner supply, according to an embodiment of the present disclosure.

FIG. 10A is a timing chart of cases where the toner supply in which the toner supply of black (K) color toner and the toner supply of cyan (C) color toner are sequentially performed is performed only once, according to the present embodiment.

Figure 10B:
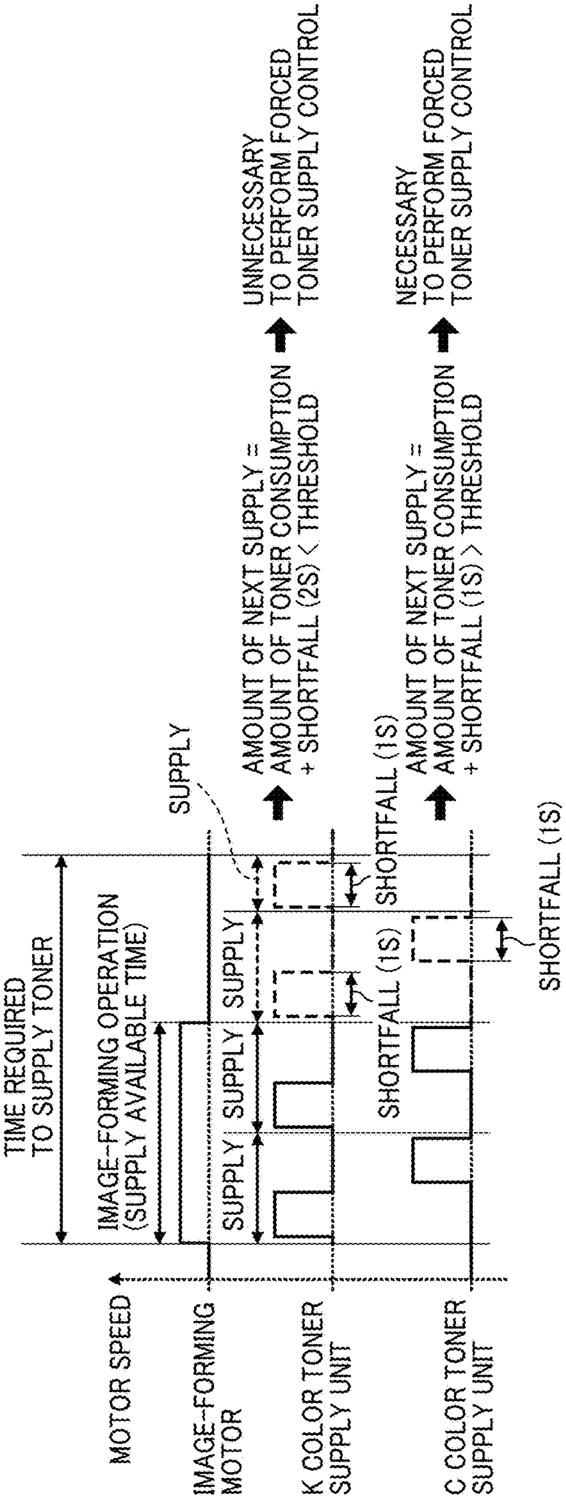
FIG. 10B is a timing chart of toner supply control in which a desired amount of toner is supplied to each developing device in the toner supply performed multiple times, according to an embodiment of the present disclosure.

FIG. 10B is a timing chart of cases in which the toner supply is performed a plurality of times, according to the present embodiment.

In the present embodiment described with reference to FIG. 10A and FIG. 10B, the length of time of the image-forming operation is shorter by 3 seconds (S) than the length of time required to supply a desired amount of toner to each of the developing device 50K that handles black (K) color toner and the developing device 50C that handles cyan (C) color toner.

In the toner supply control described above with reference to FIG. 10A, firstly, the K color toner supply unit 160K drives the toner conveying screw 614K to rotate for the drive time stored in the nonvolatile memory to supply a desired amount of toner to the developing device 50K that handles black (K) color toner. Secondly, in the toner supply control described above with reference to FIG. 10A, the rotation direction of the supply motor 603 is switched, and the C color toner supply unit 160C drives the toner conveying screw 614C to rotate for the drive time stored in the nonvolatile memory. As a result, a desired amount of toner is supplied to the developing device 50C that handles cyan (C) color toner.

As illustrated in FIG. 10A, the toner supply available time or the length of time of the image-forming operation is substantially equal to the drive time or the supplying time to supply toner of the toner conveying screw 614K for black (K) color toner. For this reason, toner is not at all supplied to the developing device 50C that handles cyan (C) color. As a result, for cyan (C) color toner, the amount of toner supply for the next time to which the amount of lacking toner, which corresponds to, for example, the lacking drive time of 3 seconds, is added, which corresponds to the drive time of the toner conveying screw 614C, exceeds the threshold ("YES" in step S5 of FIG. 9), and the forced toner supply control is performed before the next image-forming operation.

In the toner supply control described above with reference to FIG. 10B, the length of time of one-time toner supply is shortened, and the toner supply is performed a plurality of times. By so doing, a desired amount of toner is supplied to each developing device. More specifically, in the toner supply according to the present embodiment, the maximum supplying time is determined in advance and the toner supply of black (K) color toner and the toner supply of cyan (C) color toner are switched when the supplying time to supply toner exceeds the maximum supplying time. In the toner supply control according to the present embodiment, such toner supply of black (K) color toner and cyan (C) color toner is performed repeatedly to satisfy the drive time stored in the nonvolatile memory. Accordingly, a desired amount of toner is supplied to each one of the developing devices 50K and 50C.

As described above, by performing the toner supply of black (K) color toner and cyan (C) color toner a plurality of times to satisfy the drive time stored in the nonvolatile memory, the toner of both black (K) color and cyan (C) color can be supplied to the developing devices 50, which is different from the toner supply control described above with reference to FIG. 10A.

In the toner supply control described above with reference to FIG. 10B, the lacking drive time can be divided into the lacking drive time for black (K) color toner and the drive time for cyan (C) color toner. More specifically, in FIG. 10B, the lacking drive time for black (K) color toner is 2 seconds (S), and the lacking drive time for cyan (C) color toner is 1 second (S). As described above, as the lacking drive time is divided into the lacking drive time for black (K) color toner and the drive time of cyan (C) color toner, the amount of toner supply of both cyan (C) color toner and black (K) color toner for the next time to which the amount of lacking toner, which corresponds to the lacking drive time, is added can be prevented from exceeding the threshold. Note also that the amount of toner supply for the next time corresponds to the drive time of the toner conveying screw. Due to such prevention from exceeding the threshold in regard to both cyan (C) color toner and black (K) color toner, the forced toner supply control can be prevented from being performed before the next image-forming operation. As a result, the photoconductors 41 are prevented from being driven except during the image-forming operation, and a reduction in the useful life of the photoconductors can be prevented.

Figure 11:
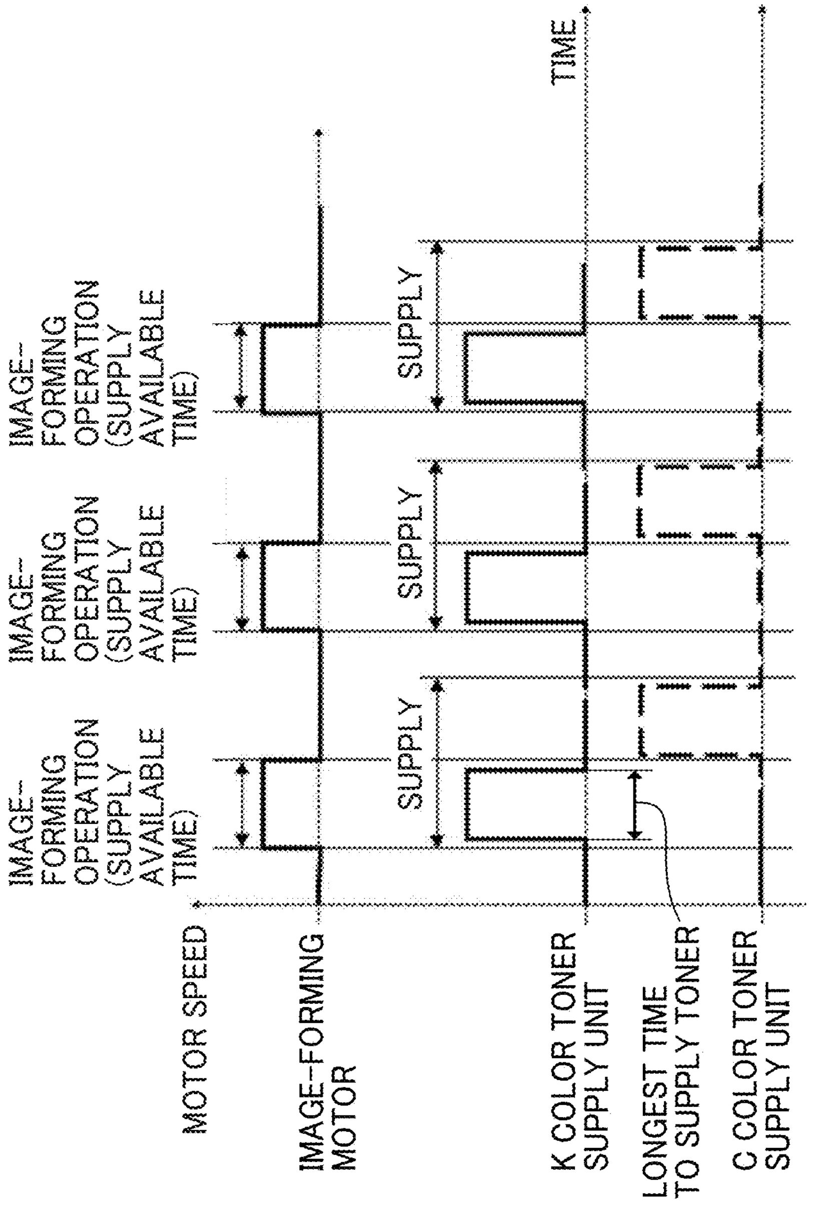
FIG. 11 is a timing chart to explain a problem of toner supply control when the shortest image-forming operation is performed continuously a plurality of times, according to the related art.

However, as illustrated in FIG. 10B, there is room for improvement in the toner supply device that performs the toner supply control in which the length of time of one-time toner supply is shortened and the toner supply is performed a plurality of times to supply a desired amount of black (K) color toner and cyan (C) color toner. More specifically, as illustrated in FIG. 11, when the length of time of the image-forming operation or the toner supply available time is very short and the length of time of the image-forming operation is equal to or shorter than the maximum supplying time, there are some cases in which toner is not at all supplied to the developing device 50C that handles cyan (C) color. In FIG. 11, the length of time of the image-forming operation is equal to the maximum supplying time. The length of time of the image-forming operation is the length of time elapsed since the photoconductors 41 started rotating for image formation by the time at which the photoconductors 41 stops rotating. In other words, the length of time of the image-forming operation is the drive time of the image-forming motor.

When the length of time of the image-forming operation is very short, the amount of toner consumption is small. Accordingly, if the image-forming operation whose operation time is very short is performed only once, the amount of toner in the developing device 50 that handles cyan (C) color toner does not decrease to such an extent that the image quality is affected. In other words, the amount of toner supply for the next time to which the amount of lacking toner is added or the drive time of the toner conveying screw to which the lacking drive time is added does not exceed the threshold. However, as illustrated in FIG. 11, when the image-forming operation whose operation time is very short continues several times, the amount of lacking toner that corresponds to the lacking drive time is accumulated. As a result, the amount of toner supply for the next time, which corresponds to the drive time of the toner conveying screw, exceeds the threshold, and the amount of toner in the developing device 50 decreases to such an extent that the image quality is affected. Accordingly, for cyan (C) color toner, the forced toner supply control is performed in an undesired manner.

In order to handle such a situation, the maximum supplying time in the toner supply may be made equal to or shorter than the minimum time of image-forming operation, and the length of time of the toner supply may be made shorter than the minimum time of the image-forming operation. The minimum time of the image-forming operation according to the present embodiment indicates the length of time when an image is formed on a single sheet P whose length in the conveyance direction is minimum necessary to be conveyed in the printer unit 100 according to the present embodiment.

However, if the maximum supplying time is shortened, due to the rotation of the container body 33 of the toner container 32, the container body 33 stops rotating and the operation is switched to the toner supply of the next color before the toner inside the toner container 32 is sufficiently loosened. In other words, the toner conveying screw tends to stop rotating before the toner in the conveyance nozzles 611 is sufficiently loosened by the toner conveying screws 614. As a result, the toner in the toner container or the conveyance nozzle is not sufficiently loosened over time, and the toner in the toner container and the conveyance nozzle tends to be tightened. As a result, the toner cannot easily be conveyed, and the amount of toner supply per unit time tends to be reduced.

The length of time of the image-forming operation or the toner supply available time may be calculated based on, for example, the conveyance direction of the sheet on which images are to be formed, the length of the sheet, or the number of sheets to be printed continuously, and the maximum supplying time may be determined based on the obtained length of time of the image-forming operation. However, in such a configuration, the operation of toner supply control tends to become complicated.

In order to handle such a situation, in the present embodiment, the maximum supplying time in the toner supply for the first time is made shorter than the maximum supplying time in the toner supply for the second and following times.

Figure 12:
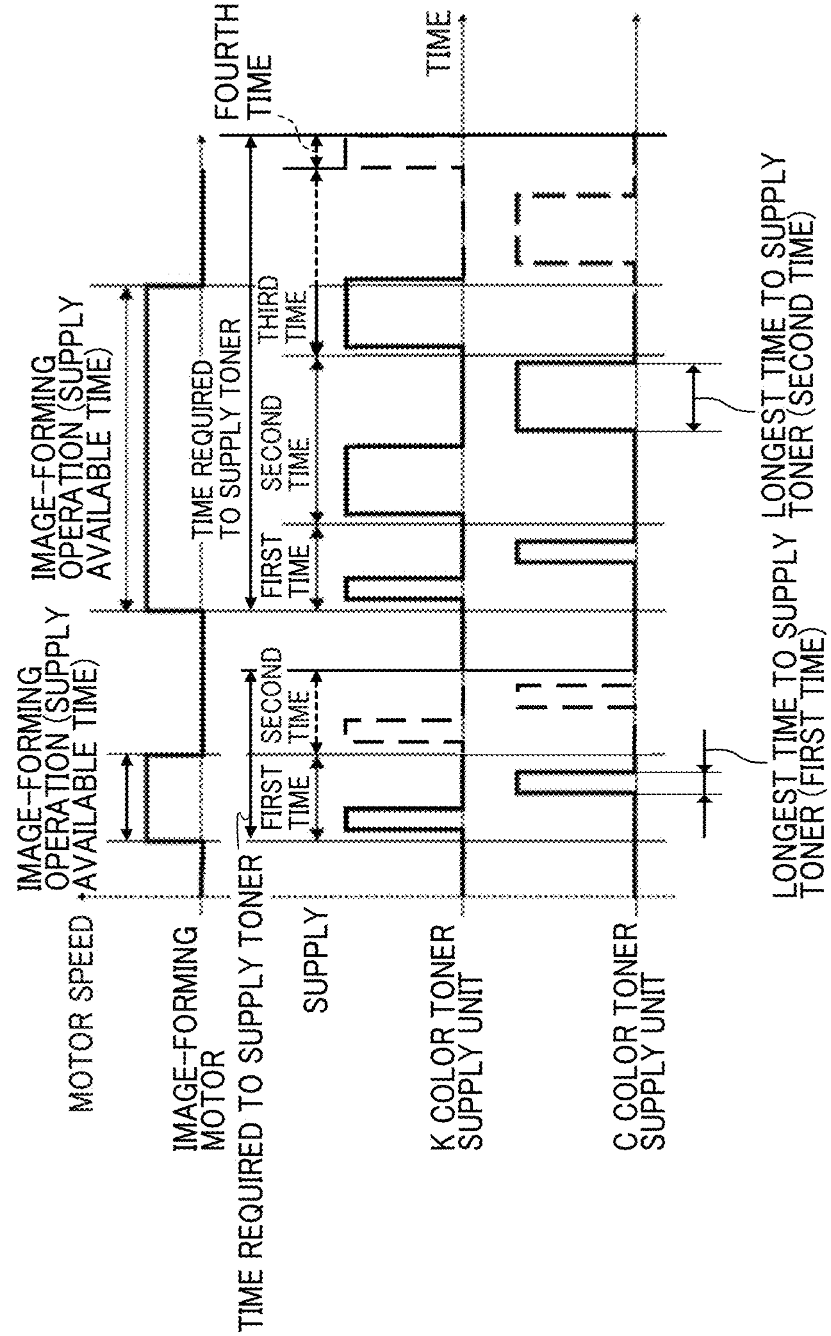
FIG. 12 is a timing chart of toner supply control according to an embodiment of the present disclosure.

FIG. 12 is a timing chart of toner supply control according to the present embodiment.

In the present embodiment described with reference to FIG. 12, the maximum supplying time is reduced to half the minimum time of the image-forming operation or shorter, and the length of time of the toner supply for the first time after the toner supply control starts is made shorter than the minimum time of the image-forming operation.

By making the length of time of the toner supply for the first time shorter than the minimum time of the image-forming operation, even when the length of time of the image-forming operation is the shortest as illustrated in FIG. 12, the toner of both cyan (C) color and black (K) color can be supplied to the developing devices. Due to such a configuration, the forced toner supply control that is performed when the image-forming operation where the length of time of the image-forming operation is very short continues can be prevented. More specifically, in the case of FIG. 11, only the amount of lacking toner of cyan (C) color, which corresponds to the lacking drive time, is accumulated. By contrast, in the present embodiment, the amount of lacking toner, which corresponds to the lacking drive time, that is accumulated is distributed into that of cyan (C) color and that of black (K) color.

In the present embodiment described with reference to FIG. 11, for example, when the shortest image-forming operation is performed continuously three times, the amount of toner supply of cyan (C) color toner for the next time, which corresponds to the drive time of the toner conveying screw, exceeds the threshold, and the forced toner supply control is performed. By contrast, in the present embodiment, the amount of lacking toner, which corresponds to the lacking drive time, that is accumulated is distributed into that of cyan (C) color and that of black (K) color. Due to such a configuration, even when the shortest image-forming operation is performed continuously three times, the amounts of toner supply of both cyan (C) color and black (K) color for the next time, which corresponds to the drive time of the toner conveying screw, do not exceed the threshold. Accordingly, compared with the present embodiment described with reference to FIG. 11, the number of occurrences in which the forced toner supply control is performed can be reduced and a reduction in the useful life of the photoconductors can be prevented in the present embodiment.

The maximum supplying time in the toner supply for the second and following times is made longer than the maximum supplying time in the toner supply for the first time. Due to such a configuration, the length of time of the image-forming operation, which corresponds to the toner supply available time, is sufficiently long. Moreover, when the toner supply is performed a plurality of times, the toner in the toner container and the conveyance nozzle can be loosened as desired in the toner supply for the second and following times. Due to such a configuration, the toner in the toner container and the conveyance nozzle can be prevented from being tightened over time, and a reduction in the amount of toner supply per unit time can be prevented. Moreover, as the toner supply control can be performed evenly regardless of the length of time of the image-forming operation, the toner supply control can be simplified, and the toner supply device and the image forming apparatus according to the above embodiments of the present application can be produced at low cost.

Figure 13:
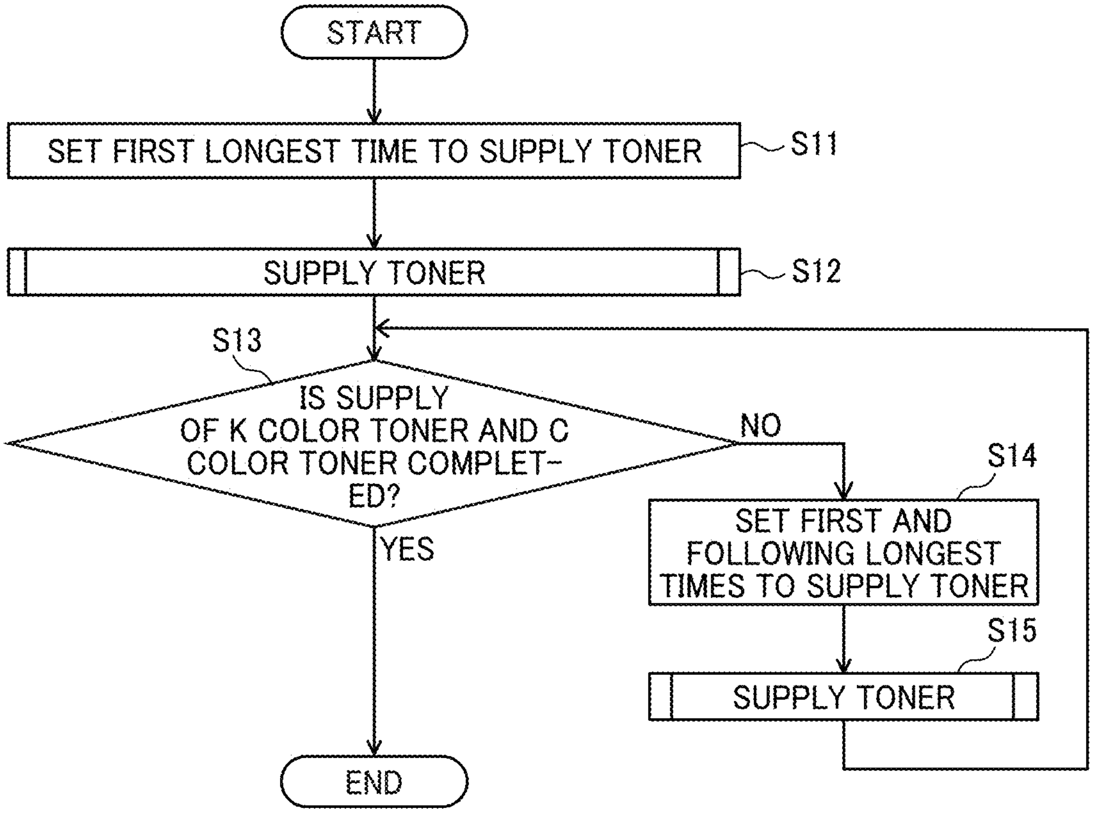
FIG. 13 is a flowchart of toner supply control according to an embodiment of the present disclosure.

FIG. 13 is a flowchart of the processes of toner supply control, according to the present embodiment.

Figure 14:
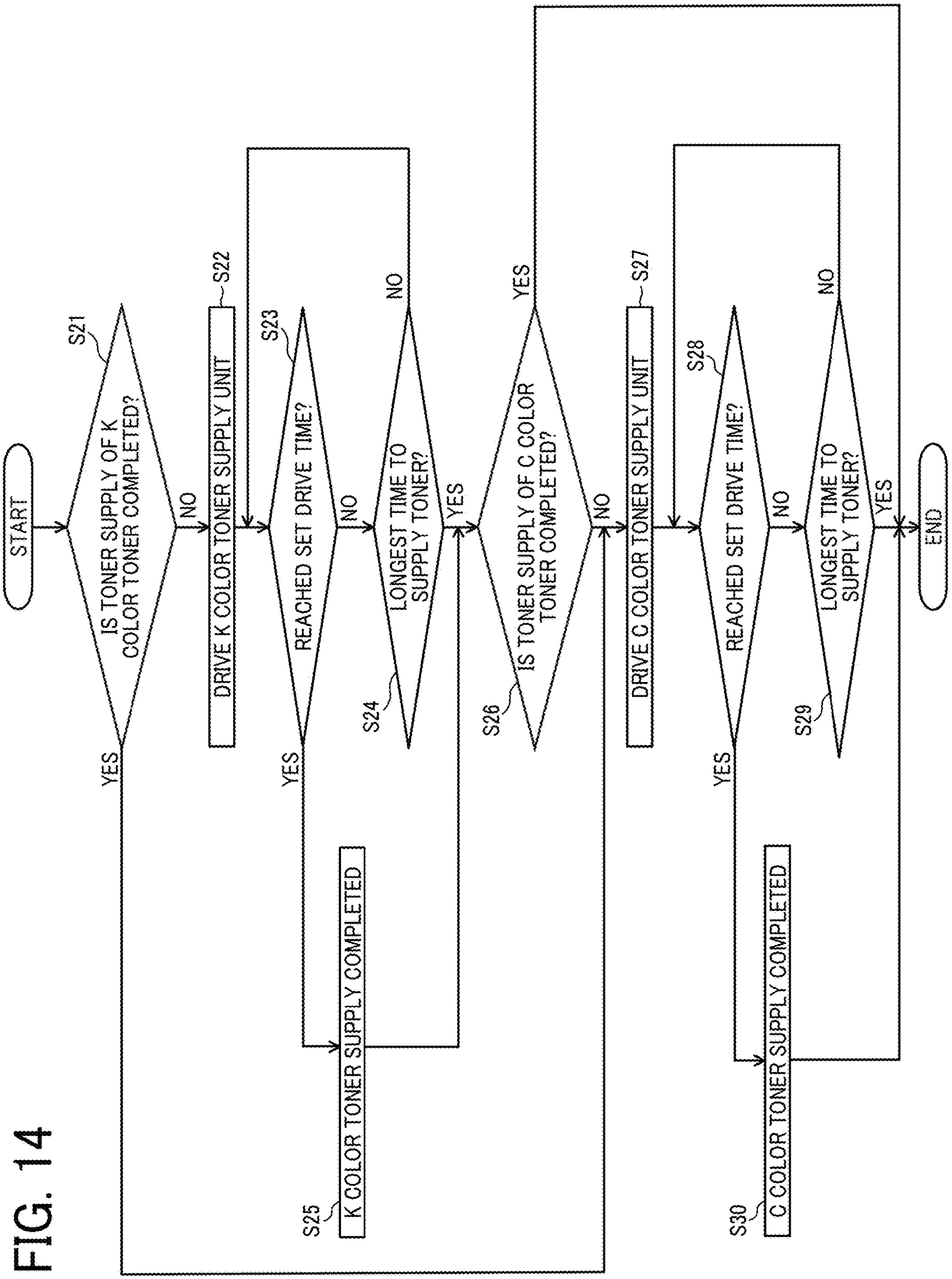
FIG. 14 is a flowchart of toner supply according to an embodiment of the present disclosure.

FIG. 14 is a flowchart of toner supply according to the present embodiment.

As illustrated in FIG. 13, when the driving of the image-forming motor and the rotation of the photoconductors 41 start and the image-forming operation starts, toner supply control starts. When the toner supply control starts, in step S11, the controller 90 defines the maximum supplying time in the toner supply for the first time, which is stored in the nonvolatile memory of the controller 90, as the maximum supplying time. Then, in step S12, the controller 90 performs the toner supply illustrated in FIG. 13. When the toner supply of black (K) color toner and cyan (C) color toner is not completed in the toner supply for the first time ("NO" in step S13), in step S14, the controller 90 defines the maximum supplying time in the toner supply for the second and following times, which is stored in the nonvolatile memory of the controller 90, as the maximum supplying time. In step S15, the controller 90 performs the toner supply illustrated in FIG. 13. Until the toner supply of both black (K) color toner and cyan (C) color toner is completed ("YES" in step S13), the controller 90 repeats the processes in steps S14 and S15.

As illustrated in FIG. 14, in the toner supply according to the present embodiment, when the toner supply of black (K) color toner is completed ("YES" in step S21), in steps S27 to S30, the toner supply of cyan (C) color toner is performed without driving the K color toner supply unit 160K.

By contrast, when the toner supply of black (K) color toner is not completed ("NO" in step S21), in step S22, the K color toner supply unit 160K is driven to supply the K color toner. When the total drive time of the toner conveying screw, which corresponds to the supplying time to supply toner, satisfies the set drive time before exceeding the set maximum supplying time in the processes described with reference to FIG. 9 ("YES" in step S23), it is determined that a desired amount of black (K) color toner is supplied and the K color toner supply is completed ("YES" in step S25). When the toner supply of cyan (C) color toner is completed ("YES" in step S26), the toner supply is completed. In such cases, the toner supply of both black (K) color toner and cyan (C) color toner is completed, and the toner supply control is completed ("YES" in step S13 of FIG. 13). By contrast, when the toner supply of cyan (C) color toner is not completed ("NO" in step S26), in steps S27 to S30, the toner supply of cyan (C) color toner is performed.

When the supplying time to supply black (K) color toner, which corresponds to the drive time of the toner conveying screw 614K, exceeds the maximum supplying time ("NO" in step S23 and "YES" in step S24) and the toner supply of cyan (C) color toner is completed ("YES" in step S26), the toner supply is completed. By contrast, when the toner supply of cyan (C) color toner is not completed, in steps S27 to S30, the toner supply of cyan (C) color toner is performed. In these cases, a desired amount of black (K) color toner is not supplied to the developing device, and the toner supply is performed a plurality of times ("NO" in step S13 of FIG. 13).

In a similar manner to the case of black (K) color toner, in the toner supply of cyan (C) color toner, when the total drive time of the toner conveying screw, which corresponds to the supplying time to supply toner, satisfies the set drive time before exceeding the set maximum supplying time in the processes described with reference to FIG. 9 ("YES" in step S28), in step S30, it is determined that a desired amount of cyan (C) color toner is supplied and the C color toner supply is completed. When the toner supply of black (K) color toner is completed in the above steps, it is determined that the toner supply control is completed ("YES" in step S13 of FIG. 13). By contrast, when the toner supply of black (K) color toner is not completed, the toner supply for the next time will be only black (K) color toner.

When the maximum supplying time for the cyan (C) color toner has passed ("YES" in step S29), the toner supply is terminated without completing the toner supply. As the toner supply of at least cyan (C) color toner is not completed at this point in time ("NO" in step S13 of FIG. 13), in steps S14 and S15, the toner supply continues.

In the above-described embodiments of the present disclosure, the maximum supplying time for the second and following times is even. However, no limitation is indicated thereby, and the maximum supplying time may be made longer step by step. By so doing, chances of the developing devices supplying no toner in the toner supply for the second time can be reduced, and the toner inside the toner container or the conveyance nozzle can be well loosened compared with the toner supply for the first time.

The ratio of the maximum supplying time to supply the black (K) color toner to the maximum supplying time to supply the cyan (C) color toner in the toner supply for the first time may be changed based on the drive time of the toner conveying screws for multicolor toner, which corresponds to the amount of required toner supply. For example, when the calculated drive time of the toner conveying screw for the next time for cyan (C) color toner has a sufficient margin for the threshold and the calculated drive time of the toner conveying screw for the next time for black (K) color toner has a little margin for the threshold, the ratio of the maximum supplying time to supply the black (K) color toner in the toner supply for the first time is increased. Due to such a configuration, when the image-forming operation where the length of time of the image-forming operation is very short continues, the number of occurrences in which the forced toner supply control is performed can further be reduced.

The above-described embodiments of the present disclosure are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The embodiments described above are given as an example, and unique advantageous effects are achieved for each of the following modes given below.

First Aspect

The toner supply device 60 includes a plurality of toner containers such as the multiple toner containers 32C and 32K that contain toner used to form a latent image on a latent-image bearer such as the photoconductor 41, and perform toner supply control in which toner is supplied from a plurality of toner containers to a plurality of developing devices. In the toner supply control, toner supply is repeatedly performed in which one of the plurality of toner containers supplying the toner is switched to another one of the plurality of toner containers when a supplying time to supply the toner from one of the plurality of toner containers to corresponding one of the plurality of developing devices exceeds a prescribed maximum supplying time, and the prescribed maximum supplying time from one of the plurality of toner containers, in the toner supply performed for a first time after the toner supply control starts, is shorter than the prescribed maximum supplying time from one of the plurality of toner containers in the toner supply performed for second and following times.

When the toner supply control is performed during the image-forming operation, the length of time of the image-forming operation varies depending on the conveyance direction of the sheet (P), the length of the sheet (P), or the number of sheets to be printed continuously, and the toner supply available time also varies accordingly. For this reason, there are some cases in which the length of time of the image-forming operation becomes shorter than the length of supplying time to supply a desired amount of toner to each developing device, which corresponds to the length of time of the toner supply control. In such cases, the toner supply control is terminated when the image-forming operation is completed. In cases where the toner supply control is performed as follows, there may be a developing device to which toner is not at all supplied when the length of time of the image-forming operation is very short. In such cases, for example, toner supply is repeatedly performed in which one of the multiple toner containers that supply the toner is switched to another one of the multiple toner containers when the supplying time to supply toner from one of the multiple toner containers to corresponding one of the multiple developing devices exceeds the prescribed maximum supplying time (see FIG. 10B). If such toner supply control is performed, the length of time of the image-forming is very short, and once the image-forming operation is completed before the toner supply performed for the first time after the toner supply control starts ends, there may be a developing device to which toner is not at all supplied (see, for example, FIG. 11). If such an image-forming operation where the length of time of the image-forming operation is very short is continuously performed, there may be a developing device that lacks toner, and the image quality may deteriorate as, for example, an image may be blurred and a desired level of image density is not achieved.

In order to handle such a situation, in the toner supply device 60 according to the first aspect of the present disclosure, as illustrated in FIG. 12, the prescribed maximum supplying time to the toner container in the toner supply performed for the first time after the toner supply control starts is made shorter than the maximum supplying time in the toner supply for the second and following times. Due to such a configuration, in the toner supply for the first time, the toner can be supplied in a short period of time to all the developing devices to which the toner is to be supplied. Accordingly, cases in which toner is not at all supplied to the developing device when the length of time of the image-forming operation is very short can be prevented, and cases in which the developing device lacks toner can be prevented.

By making the prescribed maximum supplying time for the toner container in the toner supply for the second and following times longer than the prescribed maximum supplying time from one of the plurality of toner containers in the toner supply for the first time, the length of time of the image-forming operation can be made relatively long. Moreover, when the toner supply is performed for the second time, the toner inside the multiple toner containers and the toner inside the toner supply path can be stirred and loosened as desired. Accordingly, the toner inside the multiple toner containers and the toner inside the toner supply path can be prevented from being tightened over time. As a result, the toner inside the multiple toner containers and the toner inside the toner supply path can be prevented from being tightened upon conveyance, and a reduction in the amount of toner supply per unit time can be prevented.

Second Aspect

In the toner supply device 60 according to the first aspect of the present disclosure, the toner supply control is performed during an image-forming operation in which an image is formed on a sheet using the toner, and a time of the toner supply performed for the first time is shorter than a minimum time of the image-forming operation.

Due to such a configuration, even in the shortest image-forming operation, the toner can be supplied to each one of the developing devices, and the amount of toner in the multiple developing devices 50 can be prevented from decreasing to such an extent that the image quality is affected.

Third Aspect

In the toner supply device 60 according to the first or second aspect of the present disclosure, the toner supply control is performed during an image-forming operation in which an image is formed on a sheet using the toner, and when an amount of toner in one of the plurality of developing devices is reduced to a level affecting the image, the circuitry is configured to perform forced toner supply control to supply the toner to one of the plurality of developing devices whose amount of toner is reduced to the level affecting the image, except during the image-forming operation.

Due to such a configuration, a reduction in the image density of the image formed on the sheet due to an insufficient amount of toner in the developing devices can be prevented.

Fourth Aspect

In the toner supply device 60 according to any one of the first to third aspects of the present disclosure, the toner in the pair of toner containers is supplied to corresponding ones of the plurality of developing devices using a single motor such as the supply motor 603, and the motor is controlled in the toner supply for two of the plurality of toner containers to supply the toner in one of the plurality of toner containers to corresponding one of the plurality of developing devices step by step.

Due to such a configuration, as described above in the embodiments of the present disclosure, compared with the toner supply devices or image forming apparatuses in which a motor such as the supply motor 603 is provided for each one of the toner containers, the manufacturing cost of the toner supply devices or the image forming apparatus can be reduced.

Fifth Aspect

In the toner supply device 60 according to the fourth aspect of the present disclosure, one of the plurality of toner containers that supplies the toner is switched by switching a rotation direction of a motor such as the supply motor 603.

Due to such a configuration, as described above in the embodiments of the present disclosure, a plurality of toner containers that supply toner can sequentially be switched without using an electromagnetic clutch or the like, and a plurality of toner containers that supply toner can be switched at low cost.

Sixth Aspect

An image forming apparatus includes a plurality of image forming units each including a latent-image bearer such as the photoconductor 41 and the developing device 50 to develop a latent image on the latent-image bearer with toner, and a toner supply device to supply the toner to the developing device of each one of the plurality of image forming units. In such an image forming apparatus, the toner supply device according to any one of the first to sixth aspects is used as the toner supply device.

Due to such a configuration, a reduction in the useful life of latent-image bearers such as the photoconductors can be prevented.

Seventh Aspect

In the image forming apparatus according to the sixth aspect of the present disclosure, the developing device 50 and a latent-image bearer such as the photoconductor 41 of the image forming unit are driven by a single motor.

Due to such a configuration, as described above in the embodiments of the present disclosure, compared with a configuration in which the developing device is driven by a motor different from the motor that drives a latent-image bearer such as the photoconductor 41, the number of motors can be reduced, and the toner supply device and the image forming apparatus according to the above embodiments of the present application can be produced at low cost.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A toner supply device comprising:

a plurality of toner containers each containing toner used to form a latent image on a latent-image bearer; and circuitry configured to perform toner supply control to supply toner from the plurality of toner containers to a plurality of developing devices, wherein the toner supply control includes repeating toner supply in which one of the plurality of toner containers supplying the toner is switched to another one of the plurality of toner containers when a supplying time to supply the toner from one of the plurality of toner containers to corresponding one of the plurality of developing devices exceeds a prescribed maximum supplying time, and the prescribed maximum supplying time, in the toner supply performed for a first time after the toner supply control starts, being shorter than the prescribed maximum supplying time in the toner supply performed for a second time.

2. The toner supply device according to claim 1, wherein the prescribed maximum supplying time, in the toner supply performed for the first time after the toner supply control starts, is shorter than the prescribed maximum supplying time in the toner supply performed for the second time and following times.

3. The toner supply device according to claim 1, wherein the circuitry is configured to perform the toner supply control during an image-forming operation in which an image is formed on a sheet using the toner, and wherein a time of the toner supply performed for the first time is shorter than a minimum time of the image-forming operation.

4. The toner supply device according to claim 1, wherein the circuitry is configured to perform the toner supply control during an image-forming operation in which an image is formed on a sheet using the toner, and wherein, when an amount of toner in one of the plurality of developing devices is reduced to a level affecting the image, the circuitry is configured to perform forced toner supply control to supply the toner to one of the plurality of developing devices whose amount of toner is reduced to the level affecting the image, except during the image-forming operation.

5. The toner supply device according to claim 1, wherein the toner in two of the plurality of toner containers is supplied to corresponding ones of the plurality of developing devices using a single motor, and wherein the circuitry is configured to control the single motor in the toner supply for two of the plurality of toner containers to supply the toner in one of the plurality of toner containers to corresponding one of the plurality of developing devices step by step.

6. The toner supply device according to claim 5, wherein the circuitry is configured to switch a rotation direction of the single motor to switch one of the plurality of toner containers that supplies the toner.

7. An image forming apparatus comprising:

a plurality of image forming units each including a latent-image bearer and a developing device to develop a latent image on the latent-image bearer with toner; and a toner supply device including:

a plurality of toner containers each containing toner used to form a latent image on a latent-image bearer, and circuitry configured to perform toner supply control to supply toner from the plurality of toner containers to a plurality of developing devices, wherein the toner supply control includes repeating toner supply in which one of the plurality of toner containers supplying the toner is switched to another one of the plurality of toner containers when a supplying time to supply the toner from one of the plurality of toner containers to corresponding one of the plurality of developing devices exceeds a prescribed maximum supplying time, the prescribed maximum supplying time, in the toner supply performed for a first time after the toner supply control starts, being shorter than the prescribed maximum supplying time in the toner supply performed for a second time, the toner supply device supplies the toner to the developing device of each one of the plurality of image forming units.

8. The image forming apparatus according to claim 7, wherein the prescribed maximum supplying time, in the toner supply performed for the first time after the toner supply control starts, is shorter than the prescribed maximum supplying time in the toner supply performed for the second time and following times.

9. The image forming apparatus according to claim 7, wherein the developing device and the latent-image bearer of the image forming unit are driven by a single motor.

* * * * *